Aug. 7, 1956  C. WITTENMYER  2,757,861
RESULT PROVING APPARATUS FOR CALCULATIING MACHINES
Filed April 7, 1954  9 Sheets-Sheet 1

INVENTOR.
Carlos Wittenmyer.
BY Wood, Herron & Evans.
ATTORNEYS.

Aug. 7, 1956 — C. WITTENMYER — 2,757,861
RESULT PROVING APPARATUS FOR CALCULATING MACHINES
Filed April 7, 1954 — 9 Sheets-Sheet 3

INVENTOR.
Carlos Wittenmyer
BY Wood, Herron & Evans.
ATTORNEYS.

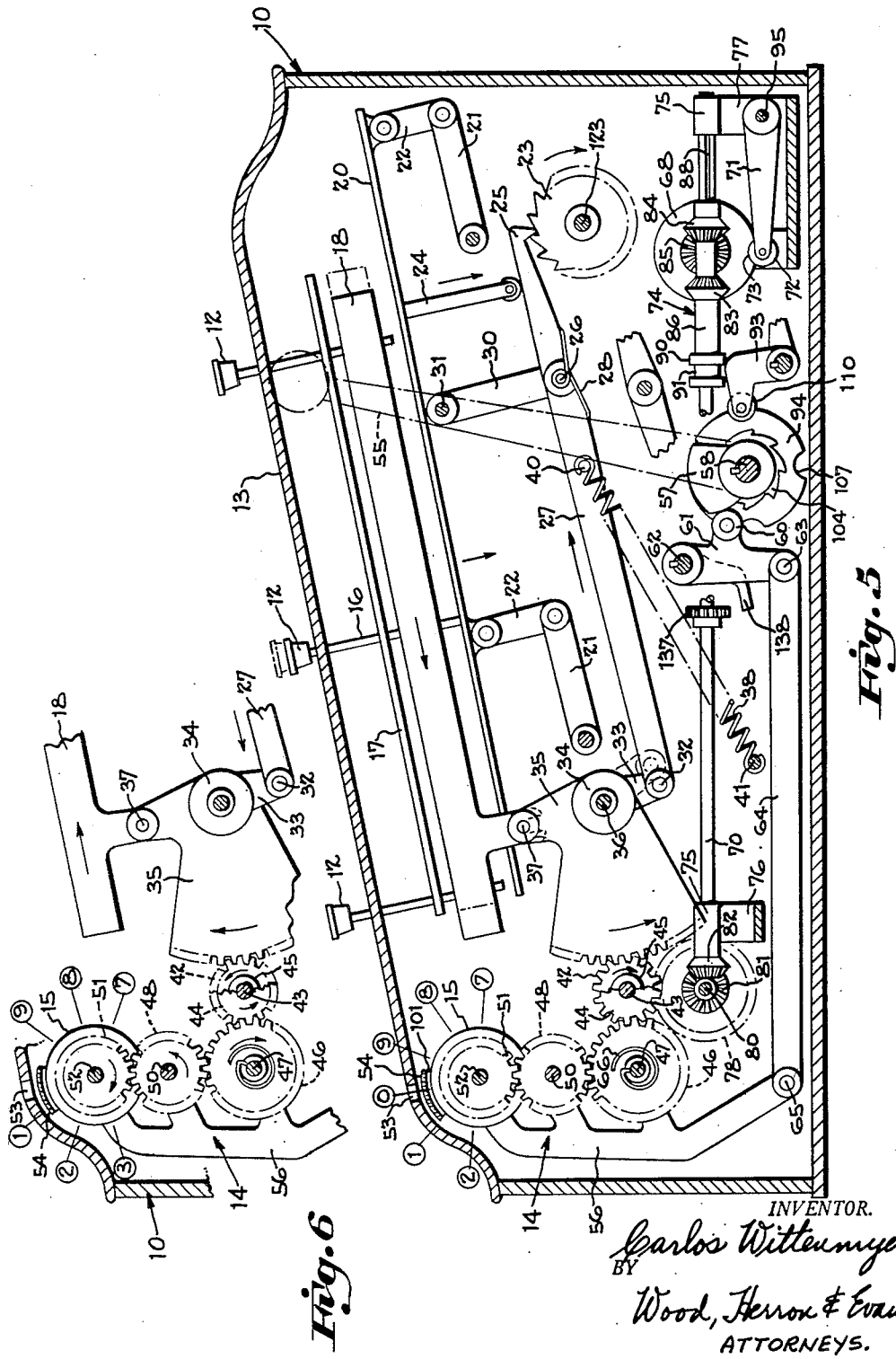

Aug. 7, 1956　　　　　C. WITTENMYER　　　　2,757,861
RESULT PROVING APPARATUS FOR CALCULATIING MACHINES
Filed April 7, 1954　　　　　　　　　　　　　　9 Sheets-Sheet 5
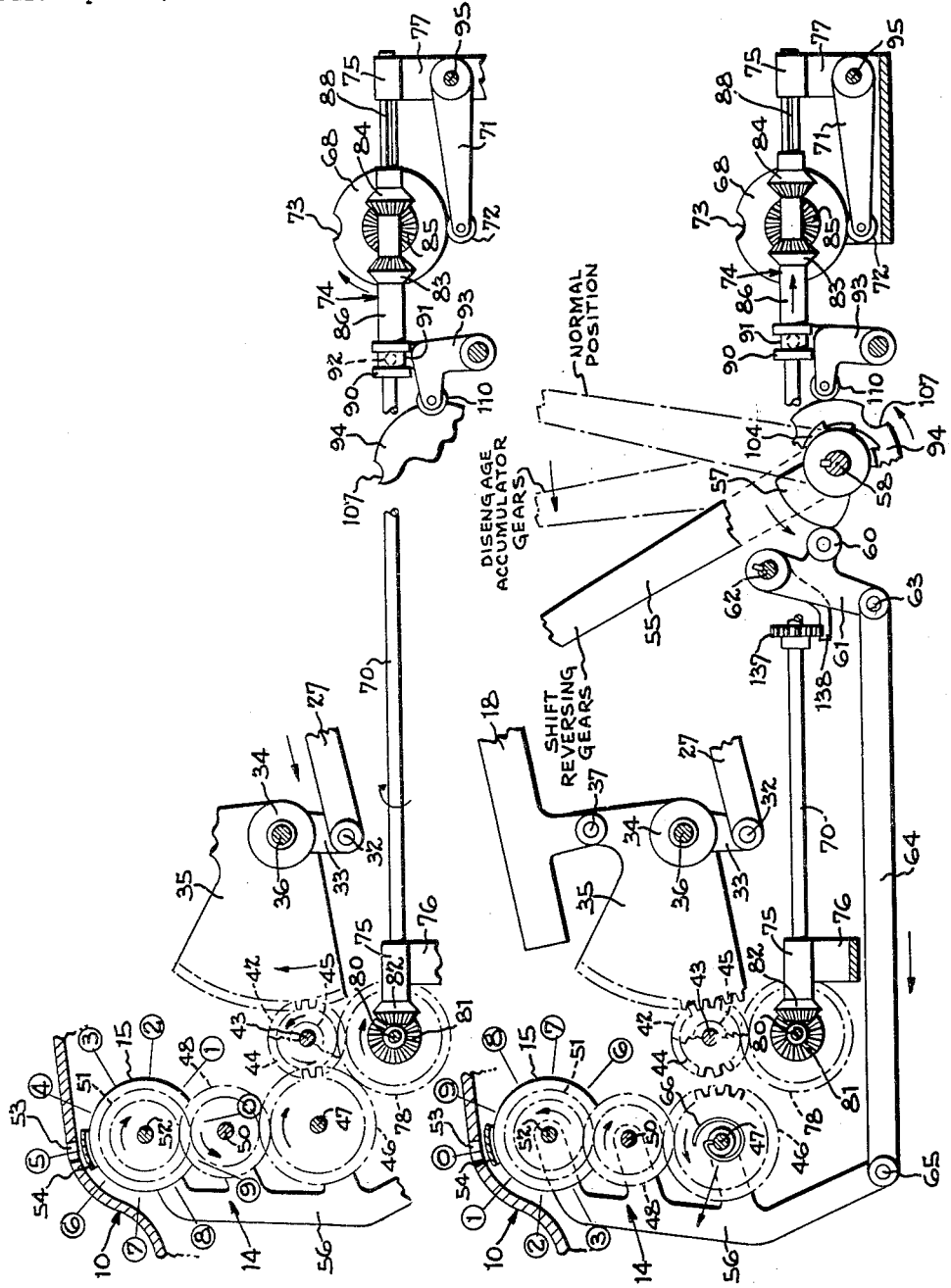
*INVENTOR.*
*Carlos Wittenmyer.*
BY
*Wood, Herron & Evans.*
ATTORNEYS.

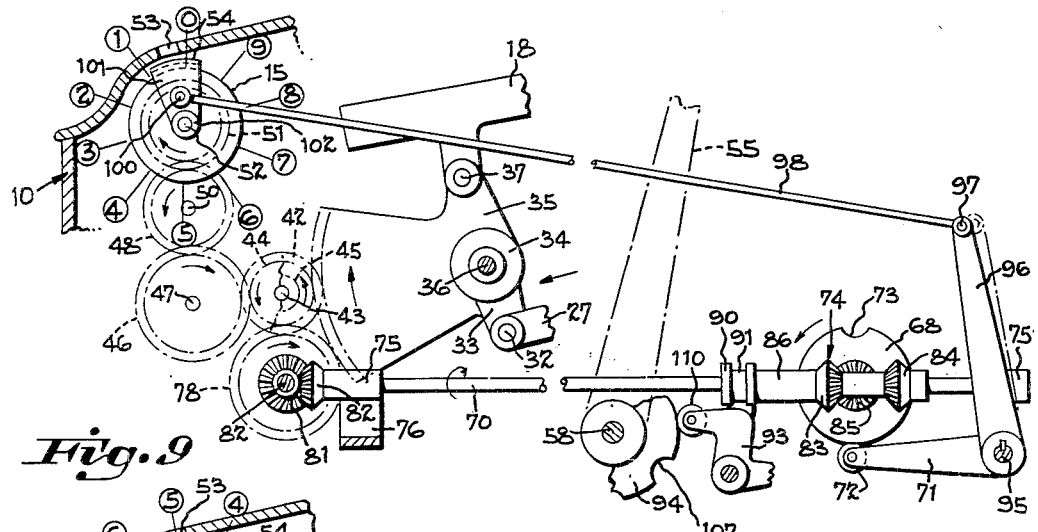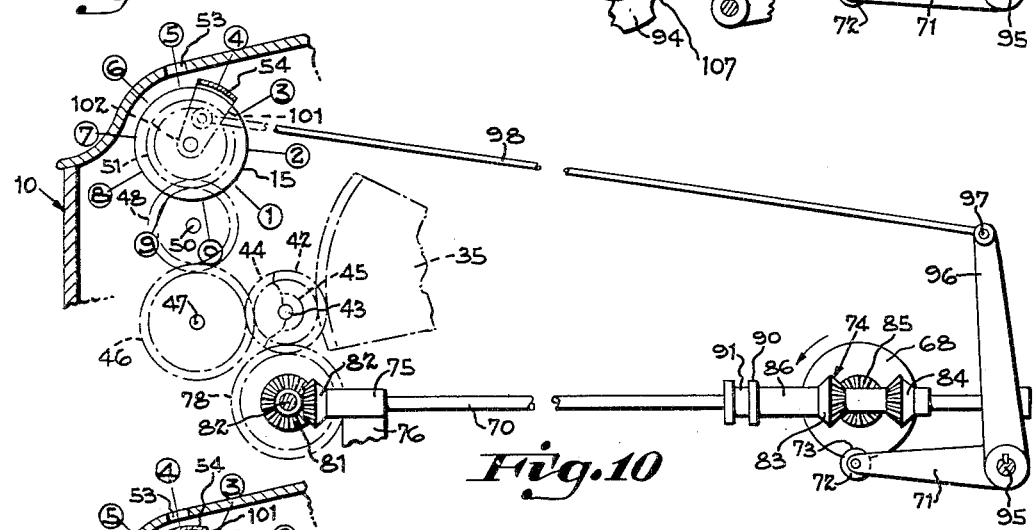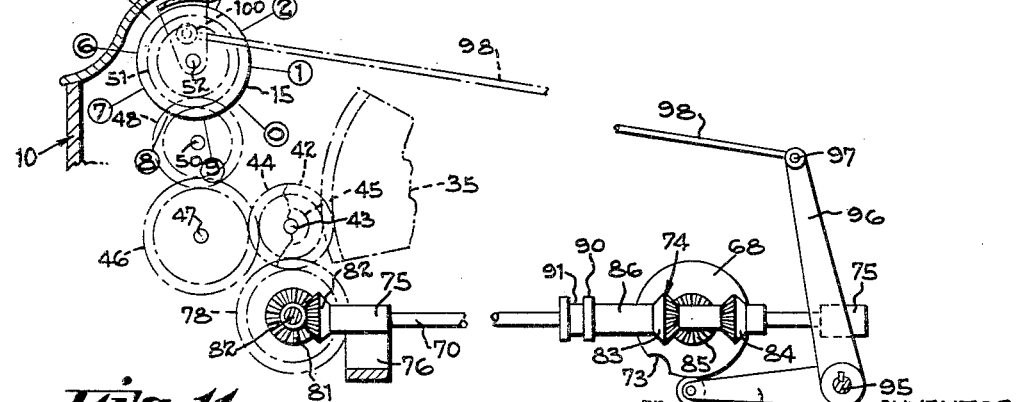

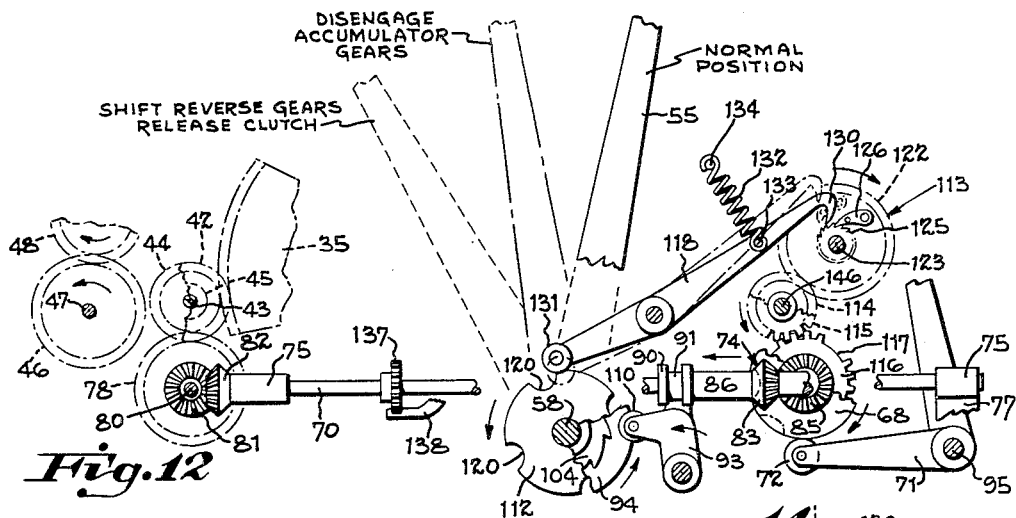
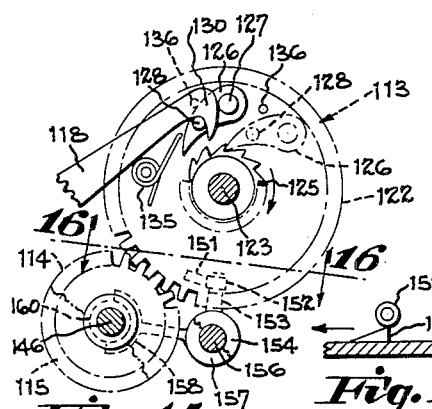
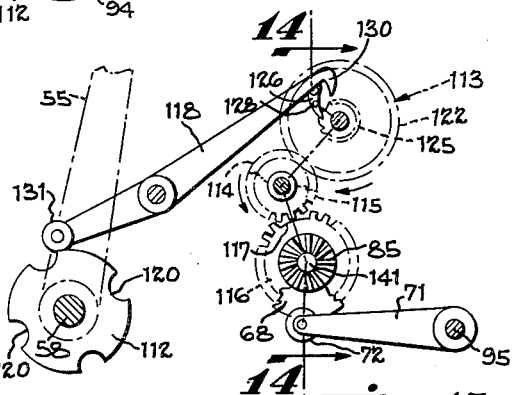
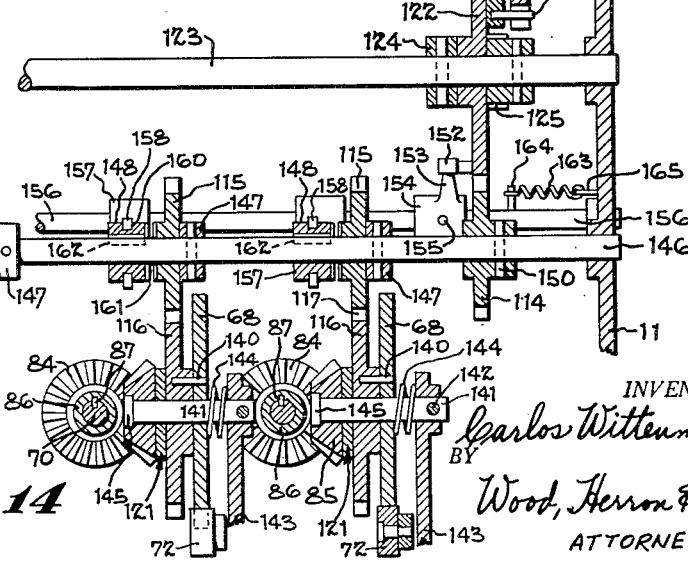

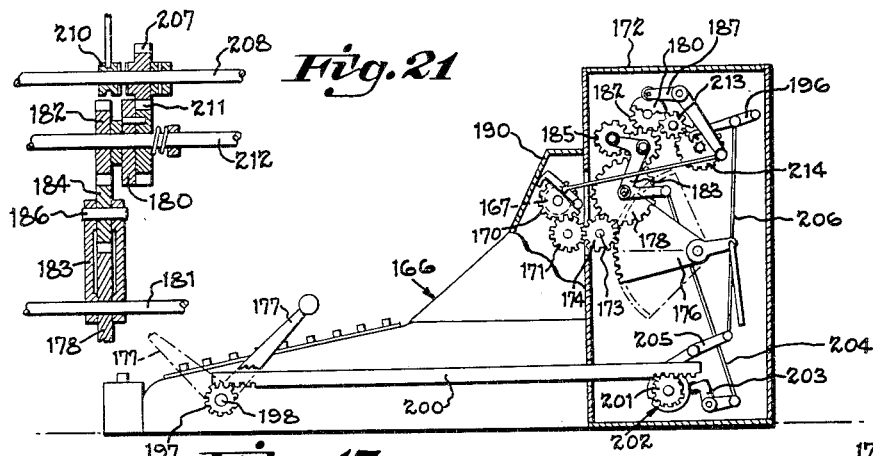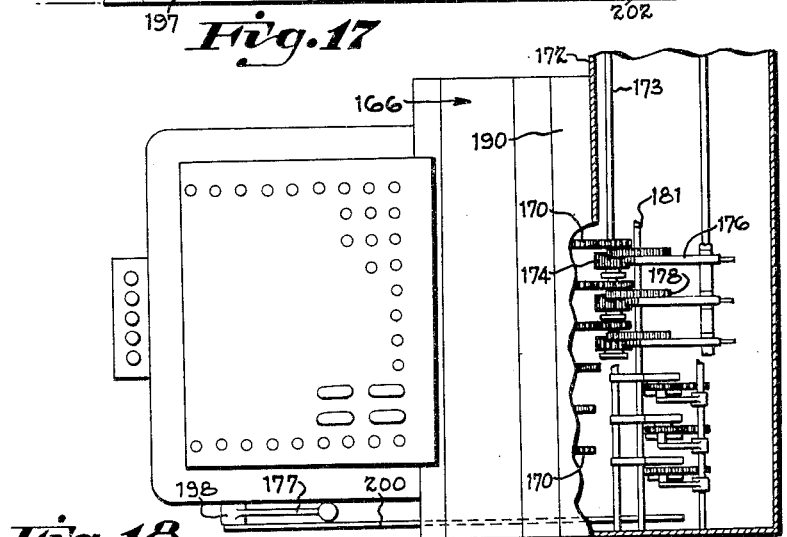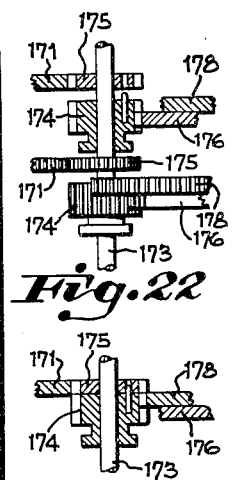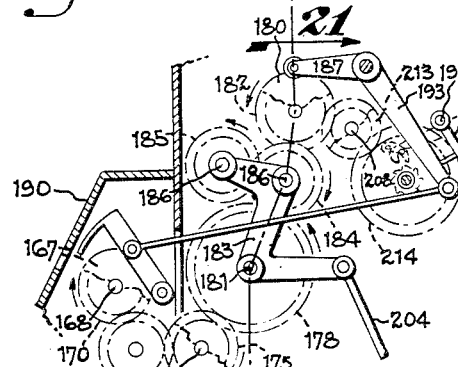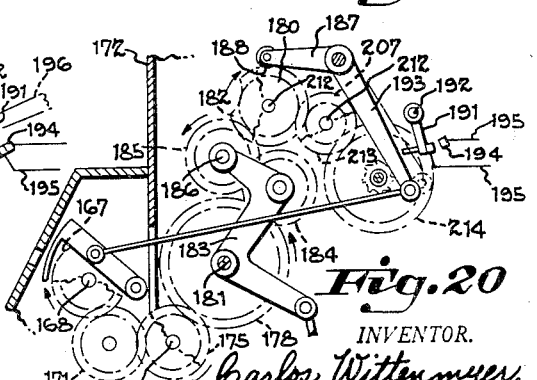

United States Patent Office 2,757,861
Patented Aug. 7, 1956

2,757,861
RESULT PROVING APPARATUS FOR CALCULATING MACHINES

Carlos Wittenmyer, Lebanon, Ohio

Application April 7, 1954, Serial No. 421,623

19 Claims. (Cl. 235—60)

This invention relates to key operated calculating machines and is directed to an apparatus which checks or proves the correctness of a calculation performed on the machine. A principal object has been to provide a proving apparatus which, as a matter of routine, requires the operator to perform each complete calculation two times, both times striking the correct keys, in order to obtain an indication of the final result.

In key responsive calculating machines, the correct result or answer naturally depends upon the manual selection of the correct keys by the operator, since it is mechanically impossible for the machine itself to arrive at an incorrect result if it is in proper running order. It follows therefore, that if the factors fed into the machine are checked mechanically for accuracy, then the final result indicated by the machine is correct. The apparatus operates upon the principle of comparing the results obtained in the two discrete calculating cycles; this provides a positive mechanical check upon the factors previously fed into the machine. If the two results fail to correspond precisely to the last digit, then the apparatus indicates that an error has occurred in the selection of at least one key during selection.

The two time selection of an identical sequence of keys to obtain the correct result reduces to a negligible factor the chance of making a mistake. Nevertheless, it must be recognized that the human element can not be wholly eliminated. Obviously, if the operator enters one incorrect figure two times, both times in the same sequence, then the final result will check out as correct. For example, if the number "25" is entered as "24" the result will not check out as correct unless the "4" key has been struck twice, both times in the same order, thus requiring the same accident (number and sequence) to be duplicated twice. It will be recognized the chance of so duplicating a mistake is so remote that it has very little effect upon the practical utility of the apparatus.

There are various types of standard calculating machines in general use to which the proving apparatus may be applied. For present purposes, they may be divided generally into two groups; those which indicate the result visually upon result wheels in the machine and those which print the result upon a sheet of paper as a record. The visual indicating machines are provided with a series of rotatable result wheels which bear result numerals. The result wheels individually are rotated to positions exposing the numerals of the result upon completion of a calculation. In the printing type of machine, a series of printing elements, corresponding generally to the result wheels and bearing the necessary type figures, are shifted to various positions to print the result directly upon the sheet.

The present checking apparatus may be applied to either type of machine without any substantial change in its principles of operation. For purposes of illustration, the apparatus is disclosed in relation to a calculating machine generally of the type disclosed in Patent No. 2,410,823 to J. M. Laiho, issued November 12, 1946. A slightly modified version of the present invention is also disclosed in relation to the prior Patent No. 2,637,493 to C. Wittenmyer issued on May 5, 1953.

The proving or checking apparatus, as explained in detail later, may be incorporated in the calculating machine as a component part but without changing the basic machine elements or their mode of operation. The machine selected to illustrate the present apparatus, as exemplified by the aforesaid Laiho patent, is intended for solving arithmetical problems generally. In its simplest aspect, it comprises a key board and a series of result wheels, normally residing in zero position, which are rotated by a key responsive power driven apparatus to their indicating positions as the factors are entered into the machine. The result wheels include return springs urging them toward their zero positions when the cancelling lever is actuated to clear the machine. In order to allow the result wheels to be reset to zero, the wheels are connected by a train of gears which is shifted out of mesh from the key responsive apparatus when the cancelling lever is operated. This allows the several wheels to rotate freely, so as to be returned to zero by the power stored in their return springs.

Briefly therefore, the normal calculating cycle, aside from the proving apparatus, consists of entering the factors by depressing the proper keys and causing the key responsive apparatus to advance the several result wheels toward an accumulated result representing the sum total of the entries. Thus, in solving a problem in addition, the amounts are entered one after the other and each amount is added by successive advancements of the result wheels. After all the entries are made, the accumulated result is observed through an opening provided in the housing of the machine. Thereafter the cancelling lever is actuated to clear the machine, causing the wheels to rotate back to zero under their stored power.

When the machine is equipped with the present checking apparatus, the operation is identically the same except that the calculating cycle is executed twice for each problem as stated earlier. Basically, the proving apparatus consists of a series of memory elements connected individually to the result wheels for motion with the wheels in one direction during the first calculating cycle and for motion in the reverse direction during the second calculating cycle. In other words, the result wheels rotate in the same direction in both cycles but a reversible driving connection reverses the direction of motion of the memory elements relative to the result wheels during the second cycle. Thus, each memory element is advanced a given amount by its associated result wheel during the first calculating cycle; thereafter, the accumulated amount is cleared by actuating the cancelling lever. When the result is cleared, the memory elements remain in the positions to which they were advanced during the first cycle but the driving connection between the memory elements and result wheels is shifted to reverse the direction of relative motion between the result wheels and memory elements. Therefore, as the result wheels are advanced during the second calculating cycle, the memory elements are moved in a reverse direction relative to the result wheels. The motion of the memory elements is relative to a starting or zero position. If all of the result wheels have indicated the same answer upon completion of both cycles, then all of the memory elements will have been shifted back to zero position. Sensing devices are associated with each memory element to determine if all the elements have been returned back to zero position. If so, they indicate that the correct result has been reached; otherwise the apparatus indicates no result or indicates that the result is incorrect.

In a preferred embodiment of the invention, the memory elements are in the form of rotatable discs, each having a depression or notch formed in its periphery. A reversible driving system connects the memory discs individually to the result wheels and a sensing finger contacts the periphery of each disc and resides in the notch at the starting or zero position. The sensing fingers are connected in common to an indicating device, such as a shield which overlies the result wheels to indicate an error and which is retracted when the answer checks out. After the first cycle, the fingers will have been shifted from their initial position by rotation of the memory discs, causing the shield to be shifted to its overlying position, thus indicating that the calculation has not been proved. If the result of the second cycle corresponds precisely to the first, then the shield will be shifted to retracted position, indicating that the result has checked out. On the other hand, if there is a difference between the first and second result, one or more of the memory discs will have failed to return to zero position and the shield remains in its overlying position.

A further object of the invention has been to provide a reset mechanism for automatically returning to their zero starting position those memory discs which have failed to do so upon completion of the second calculating cycle. For this purpose, the apparatus includes a reset or zeroing system which is effective upon operation of the cancelling lever at the end of the second cycle. If the results of the first and second cycles do not check, the reset system rotates to zero only those memory discs which requires it and does not disturb those already at zero. The reset mechanism is therefore effective after the second calculating cycle to condition the proving apparatus for the next two cycles at the same time the calculating machine is cleared by operation of the cancelling lever.

The aforesaid Wittenmyer patent relates to an electrically operated printing attachment for visual calculating machines, adapting them to print the result of the calculation upon a record sheet. As applied to the printing attachment, the result proving apparatus follows the general principles outlined above. In this case however, the proving apparatus includes an electrical switch under the control of the memory discs. This switch is interconnected in the control system of the printing attachment to decommission the printing mechanism if the two calculating cycles fail to check.

Various other features and advantages of the invention will be more clearly apparent to those skilled in the art from the following description taken in conjunction with the drawings.

Figure 5 is a diagrammatic view similar to Figure 2, showing the movement of certain parts of the calculating machine as the factors are fed into it by depressing the keys.

Figure 6 is a fragmentary view taken from Figure 5, further illustrating the movement of the parts as the numeral wheels are advanced to indicate the result or answer.

Figure 7 is a diagrammatic view showing the numeral wheel driving system and a portion of the proving apparatus at completion of the first calculating cycle, the result of the calculation being displayed by the numeral wheel and the indicating shield of the proving apparatus covering the viewing portion of the wheel.

Figure 8 is a view similar to Figure 7, showing the movements of the numeral wheel system and proving apparatus when the cancelling lever is shifted to clear the calculating machine after the first calculating cycle.

Figure 9 is a view similar to Figure 7, showing the movements of the various parts at the beginning of the second or proving cycle.

Figure 10 shows the position of the parts at completion of the proving cycle, in which the results correspond and the shield is retracted to indicate the correct result.

Figure 11 is similar to Figure 10 but showing the relationship of the parts when the two results fail to correspond.

Figure 12 is a fragmentary view, illustrating the resetting or zeroing mechanism which is effective to reset to zero the memory wheels which have not been returned to their zero position upon completion of the second calculating cycle. This mechanism is effective only in the event that the results of the first and second calculating cycles fail to correspond as indicated in Figure 11.

Figure 13 is a diagrammatic view similar to Figure 12, illustrating the zeroing mechanism in operation with the memory wheel reset to its zero position.

Figure 14 is a sectional view taken on line 14—14, Figure 13, detailing the driving gears and control mechanism of the zeroing system.

Figure 15 is an enlarged view showing the single cycle clutch mechanism of the zeroing system.

Figure 16 is a sectional view taken on line 16—16, Figure 15, detailing the throw-out cam which disconnects the zeroing system from the memory wheels at completion of the resetting cycle.

Figure 17 is a diagrammatic side view showing a modified version of the proving apparatus applied to the printing attachment of the aforesaid Wittenmyer patent.

Figure 18 is a top plan view projected from Figure 17, further illustrating the relationship of the proving apparatus and printing attachment.

Figure 19 is an enlarged diagrammatic view taken from Figure 17, illustrating the modified proving apparatus and the position of its parts at the beginning of the first calculating cycle.

Figure 20 is similar to Figure 19 but showing the position of the parts during the second or proving cycle with the memory wheel being rotated in the reverse direction toward its zero position.

Figure 21 is a sectional view taken on line 21—21, Figure 19, further illustrating the proving apparatus and a portion of the resetting or zeroing system.

Figure 22 is a fragmentary sectional view of the mechanism for coupling the result gear to the type sector driving system, the parts being in uncoupled relationship.

Figure 23 is a similar view, showing the parts coupled together for driving the proving apparatus and type sectors.

*Calculating machine*

Figure 1:
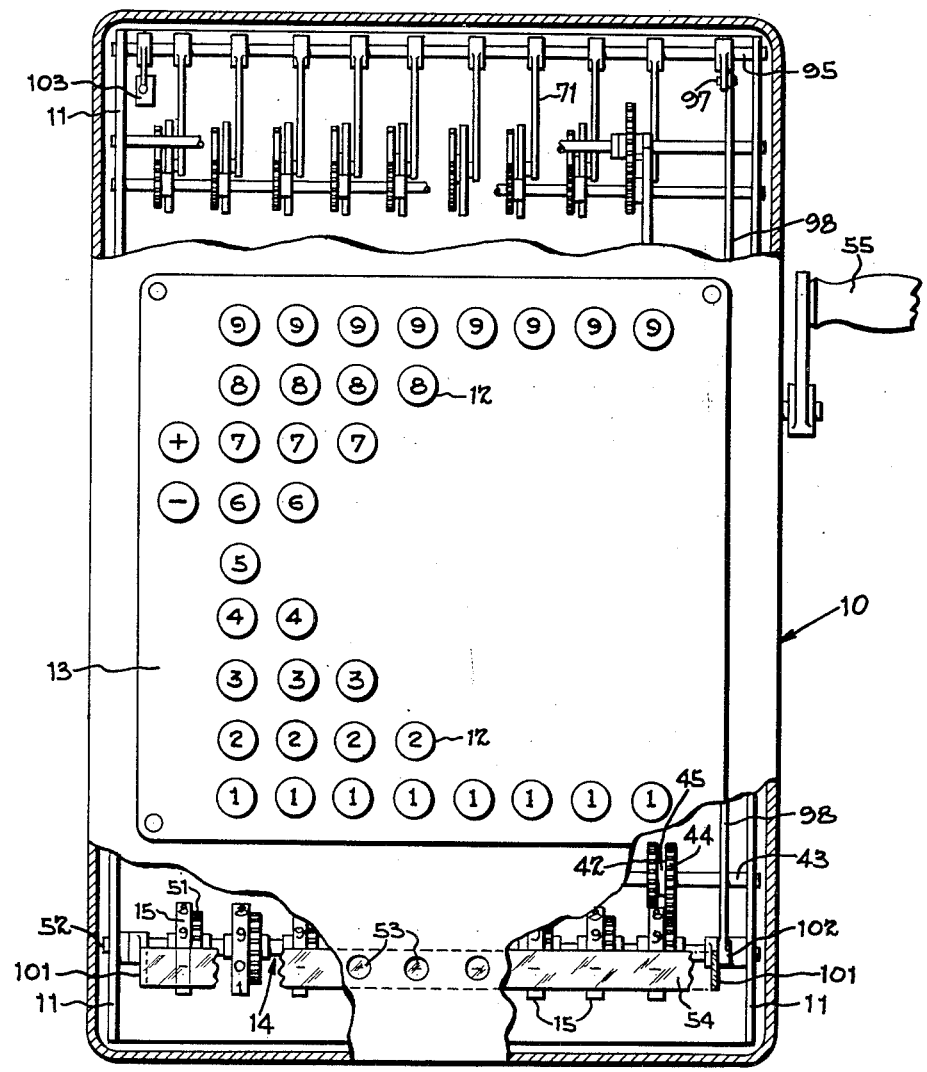
Figure 1 is a top plan view of a conventional calculating machine equipped with the proving or checking apparatus, parts of the calculating machine being broken away to show the general relationship of the apparatus within it.

For purposes of illustration, the proving apparatus is shown in the drawings in conjunction with a key-responsive calculating machine which utilizes the principles disclosed in the aforesaid Laihoe Patent No. 2,410,823.

Since the calculating machine is intended only to demonstrate the utility of the proving apparatus, only those parts are illustrated which are necessary to a general understanding of the calculating machine. It will be understood that the proving apparatus may be applied to any of the various commercial machines by establishing a suitable driving connection with the operating mechanism of the numeral wheels or printing elements.

Figure 2:
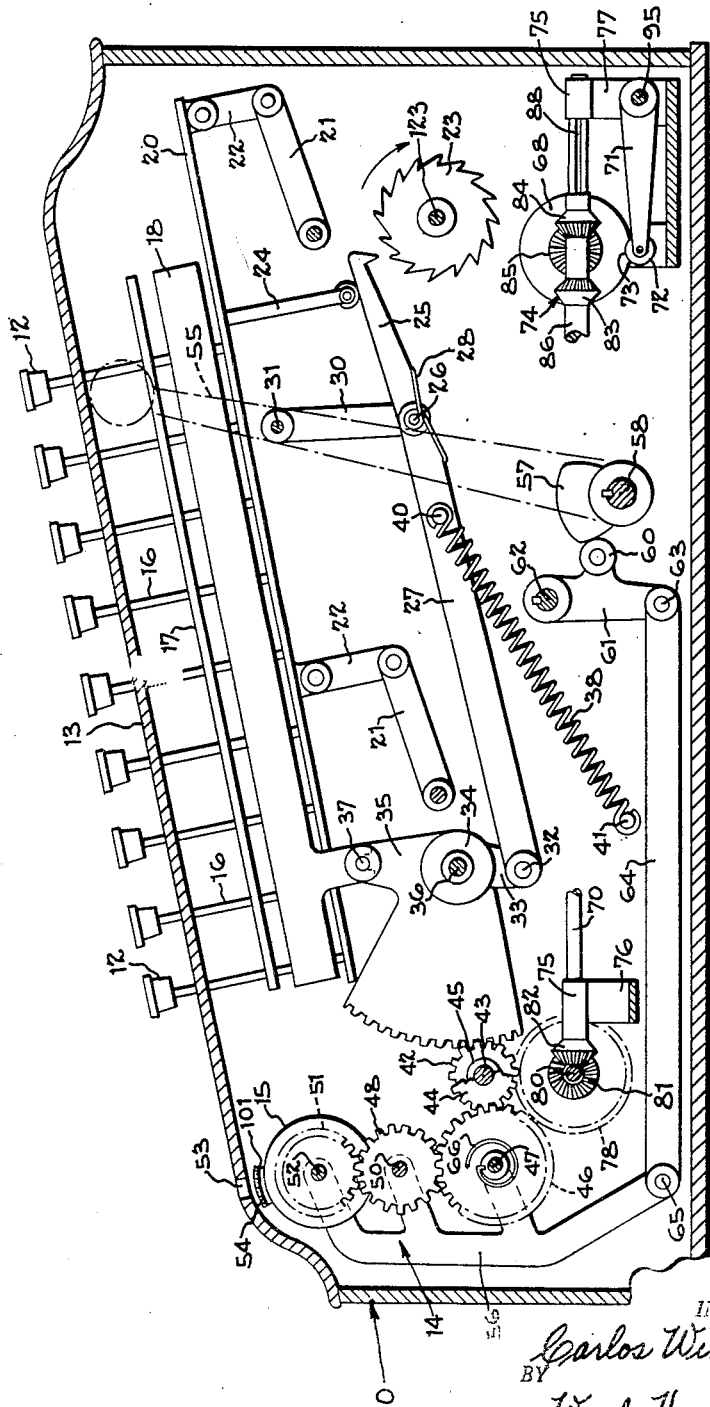
Figure 2 is a longitudinal sectional view illustrating diagrammatically certain of the parts of the calculating machine which operate in conjunction with the proving apparatus.

Referring to Figures 1 and 2, the calculating machine comprises a casing indicated generally at 10 which includes suitable side frame members 11—11 joined together in spaced relationship by tie rods (not shown) located at suitable points. The various operating parts of the calculating machine and proving apparatus are mounted upon cross shafts having their opposite ends journalled or otherwise supported in the side members. The machine includes the usual digit keys 12 arranged in columns and projecting through the keyboard 13. The keys are normally held in raised position, and upon being depressed, determine the degree of motion to be imparted to the the accumulator mechanism indicated generally at 14.

The keys are arranged in columns and each column is associated with an individual accumulator mechanism 14 which includes a result or numeral wheel 15 having upon its periphery a series of digits from "0" to "9" as indicated, the numerals corresponding to the column of keys with which the numeral wheel is associated. For purposes of simplicity, the following description is limited to a single column of keys and its associated accumulator mechanism.

Referring to Figure 2, each digit key 12 is mounted upon a stem 16 slidably projecting through a guide plate 17 and digit control bar 18, the lower end of each stem being engaged against a parallel motion bar 20. These several parts are shown diagrammatically, the parallel motion bar 20 being supported by pivoted levers 21—21 having swinging ends which are connected to the bar 20 by means of links 22—22. The calculator is power operated and includes a motor driven ratchet wheel 23, which rotates constantly in the direction indicated by the arrow in Figures 2 and 5.

When a key is depressed, as shown in Figure 5, the parallel motion bar 20 is forced downwardly by the depressed key as indicated. This causes a rod 24, projecting downwardly from the bar 20, to engage and swing a hook 25 downwardly into engagement with the teeth of the rotating ratchet wheel 23. The hook is pivotally connected as at 26 to an end of a link 27 and is normally held in elevated position by the spring 28. The rearward end of the link 27 is suspended by the pivot pin 26 to a lever 30 pivotally connected to the cross shaft 31.

Upon engagement with the ratchet wheel, the hook 25 and link 27 are moved lineally as indicated. The return motion of link 27 is transmitted to the accumulator mechanism 14 and is effective to rotate the numeral wheel as explained later. The forward end of link 27 is pivotally connected as at 32 to a lever 33 which includes a yieldable or slip clutch 34, providing a frictional driving connection to a gear sector 35, the clutch and sector being pivotally mounted upon shaft 36.

The digit control bar 18 has its forward end pivotally connected as at 37 to the gear sector; thus the control bar 18 limits the amount of downward or setting movement of the gear sector and thereby determines the degree of rotation which is imparted to the numeral wheel 15 upon the return motion of link 27 and upward motion of gear sector 35. For purposes of illustration, the "5" digit key is shown depressed in Figure 5 and the control bar 18 and gear sector 35 are shown in full lines in a setting position to rotate the numeral wheel to its "5" indicating position. The degree of motion of the gear sector and link is controlled by stop means (not shown) on the digit control bar 18; thus, as shown in Figure 5, depression of the "5" key allows the bar to move from the position shown in broken lines to that shown in full lines.

The purpose of yieldable clutch 34 is to allow the link 27 to reciprocate rearwardly for its full stroke each time that a key is depressed, the engaged tooth of the ratchet wheel disengaging automatically from the hook 25 upon continued rotation of the wheel. As described later, an overrunning clutch is provided in the drive to the accumulator mechanism which overruns during the setting or downward stroke of the gear sector, the numeral wheel remaining in its zero position as shown in Figure 5. Upon the upward or return stroke of the gear sector (Figure 6), the overrunning clutch establishes a driving connection which rotates the accumulator mechanism and numeral wheel to its indicating position as shown diagramatically by the arrows.

Upon disengagement of the hook from the ratchet wheel, the return movement is imparted to the link 27, as indicated in Figure 5, by a tension spring 38 which has one end anchored as at 40 to the link 27 and its opposite end anchored as at 41 to a cross shaft. The spring 38 draws the link 27, gear sector 35, and control bar 18 back to the position shown in Figure 7 and thereby rotates the numeral wheel through the overrunning clutch to its indicating position as shown.

Figures 3, 4:
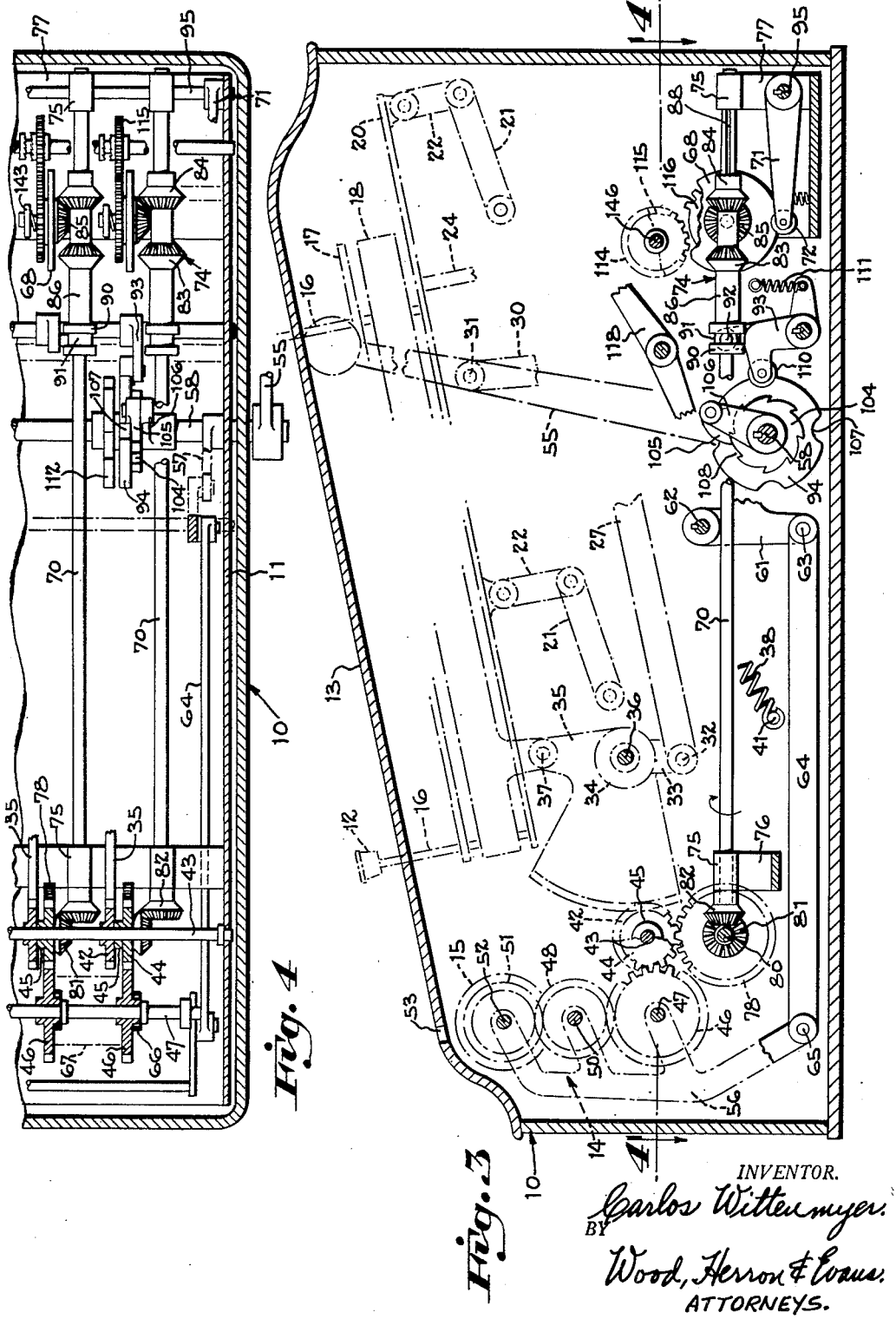
Figure 3 is a sectional view similar to Figure 2, illustrating the general arrangement of the proving apparatus and its interconnection with the accumulating mechanism of the calculating machine.
Figure 4 is a fragmentary top plan view taken on line 4—4, Figure 3, further illustrating the general arrangement of the proving apparatus.

The upward motion of gear sector 35 is transmitted to the accumulator mechanism through a one-way idler gear 42 (Figures 3 and 4) loosely journalled on shaft 43 and meshing with the gear sector 35. As shown in Figure 4, a companion gear 44 is also loosely journalled on shaft 43 and is connected to gear 42 by an overrunning clutch indicated diagrammatically at 45. The overrunning clutch allows the one-way idler gear 42 to idle in the direction indicated by the arrow in Figure 5, that is, during the down or idling stroke of the gear sector. Upon the upward stroke of the gear sector, the overrunning clutch 45 establishes a driving connection from gear 42 to companion gear 44, thus driving gear 44 in the direction indicated by the arrows (Figure 6).

Referring again to Figure 4, it will be seen that gear 44 is in mesh with an accumulator gear 46 rotatably journalled upon a shaft 47. The accumulator gear 46 in turn, meshes with an idler gear 48 (Figure 3) loosely journalled on shaft 50 and meshing with a gear 51 journalled on shaft 52. Gear 51 is attached to the numeral wheel 15. Thus, the accumulator mechanism is effective to rotate the numeral wheel to indicate the result as shown in Figures 6 and 7 upon the upward stroke of gear sector 35.

Those skilled in the art usually call the accumulator gear 46 a "carrying gear." However, in the present simplified disclosure it is so designated because it forms a part of the accumulator mechanism 14.

It will be noted in Figure 7 that the gear sector has completed its upward or indicating stroke with the numeral wheel digit "5" aligned with the viewing aperture 53. Under normal operation, for example, in adding a column of figures, the figures of the column successively are entered into the machine, causing successive advancements of the proper numeral wheels. Thus, each entry is stored in the accumulator mechanism 14 and the next entry is added to the accumulated amount. After all the entries are made, the total or result is indicated by the several numerals wheels, thus completing a calculating cycle. This result is observed through the viewing apertures and thereafter the machine is cleared by actuating the cancelling lever. The numeral wheel is illustrated in Figure 7 in a single advancement to the digit "5" in order to simplify the disclosure; however, it will be understood that it may be advanced several times during a given cycle, depending upon the number of entries made. In the event the wheel makes more than one revolution, a carry-over mechanism brings into play the adjacent wheel on the left to indicate the sum, as explained later. In the operation of the proving apparatus however, a shield 54 is interposed between the numeral wheels and apertures after completion of the first calculation and is retracted only after the calculation is repeated and proved out, as explained later.

According to the operation of the present calculating machine, the machine is cleared, that is, the numeral wheels are rotated back to zero after completion of a given calculation, by actuating a cancelling lever 55. This shifts the accumulator gear 46 out of mesh with gear 44 (Figure 8) and allows the accumulating mechanism to rotate back to zero by spring power as described below. It will be noted in Figure 8 that the shafts 47, 50 and 52 are carried in a swinging frame 56 which is pivotally suspended from the shaft 52. Upon movement of the cancelling lever to the position shown in full lines in Figure 8, the frame 56 is swung to the left to disengage the accumulator gear 46 from its driving gear 44.

For this purpose, there is provided a cam 57 keyed upon a shaft 58 to which the cancelling lever is attached (Figure 4). Tracked against the cam is a roller 60 journalled upon a lever 61 carried upon a cross shaft 62. The swinging end of lever 61 is pivotally connected as at 63 to a link 64 which has its opposite end pivotally connected as at 65 to the accumulator frame 56. The camming surface of cam 57 is configurated to disengage the accumulator gear 46 when the cancelling lever reaches its intermediate position as shown in broken lines of Figure 8. The additional movement of the cancelling lever to the position shown in full lines is utilized to shift the reversing gears of the positioning apparatus and to actuate its resetting system as explained later.

For the purposes of zeroing the numeral wheels 15 upon disengagement of the gears, each accumulator gear 46 includes a motor spring 66 having one end anchored upon the gear and an opposite end anchored upon a stationary member, for example, frame 56. When the accumulator is rotated to the indicating position shown in Figure 7 the spring is wound up and upon disengagement, the energy stored in the spring is effective to rotate the accumulator member back to zero as shown in Figure 8.

It will be understood that a carry-over mechanism is provided for each accumulator unit, that is, a mechanism to transfer one digit to the accumulator to the left in the transition from "9" to "10." By way of example, when one wheel indicates the numeral "9" and one more digit is entered upon it by further rotation, the additional digit advances the wheel to "0" and is also carried over to the numeral wheel to the left to advance the left numeral one digit, causing the two adjacent wheels to indicate "10." The carry-over is automatically repeated for each multiple of ten digits and is well understood by those skilled in the art.

Since the details of the carry-over mechanism are not essential to a clear understanding of the operation of the proving apparatus, it has been indicated diagrammatically by the broken lines 67 in Figure 4. It will be understood that the carry-over mechanism extends across all of the numeral wheels of the machine and that the proving apparatus is individually connected to the accumulator mechanism of each numeral wheel. Therefore, whether a given numeral wheel is advanced by its gear sector or by the carry-over mechanism, its indicating digits are fed into the proving apparatus to be checked by the proving apparatus as described in detail below.

Proving apparatus

As stated earlier, the proving apparatus consists essentially of a series of memory elements and associated sensing fingers, the memory elements being in driving connection with the respective accumulator mechanisms of the numeral wheels. The memory elements are shifted in one direction during the first calculating cycle and shifted in the opposite direction during the second calculating cycle. This motion is relative to a starting or zero position, such that the movement is away from the zero position during the first cycle and back toward the zero position during the second cycle. The sensing devices contact the memory elements and determine whether or not they have all been shifted back to zero after the second cycle is completed. If so, the sensing fingers indicate that the two results correspond; if one or more of the memory elements have not been returned to zero, they indicate that the two results fail to check out.

The structure illustrated in the drawings is selected to illustrate the operating principles of the apparatus but it will be understood that various equivalent elements can be utilized without departure from the concept of the invention. Referring to Figures 5 and 6, the memory elements are in the form of discs or memory wheels 68, one for each numeral wheel of the calculating machine. Each memory wheel is connected to a respective accumulator mechanism 14 by a drive shaft 70 which rotates the memory wheel in forward and reverse directions a distance corresponding to the degree of rotation imparted to the numeral wheel to which it is connected. A sensing element in the form of a lever 71 includes a roller 72 which, at zero position, resides in a depression or notch 73 formed in the memory wheel.

To simplify the description, the proving apparatus, which is duplicated for each accumulator mechanism and numeral wheel of the series, is disclosed in relation to a single accumulator mechanism. It will be understood that the structure and operation described applies to each accumulator and associated proving apparatus of the series.

During the first calculating cycle, the memory wheel is rotated in unison with the numeral or result wheel 15 in the direction indicated by the arrow in Figure 7, thus shifting the sensing lever outwardly from the notch to its second position. As explained later in detail, the shield 54, which is interconnected with the sensing levers, is shifted to the shielding position shown in Figure 7 during the first calculating cycle. Upon completion of the first cycle, the machine is cleared by actuating the cancelling lever 55, causing the numeral wheels to return to zero (Figure 8). However, the memory wheels 68 remain in the respective positions to which they were rotated during the first cycle. Also, when the cancelling lever is shifted, the driving connection to the memory wheels is reversed by shifting the reversing gear cluster 74, one for each memory wheel drive, to the second position is indicated by the arrow in Figure 8.

When the cancelling lever returns back to its normal position, the accumulator gear train is again shifted into mesh (Figure 9) for the second calculating cycle. The reversed driving connection now causes the memory wheels to be rotated in the reverse direction toward their zero position as the numeral wheels rotate toward their indicating positions for the second time. If the result of the second calculating cycle corresponds precisely to the first, then the memory wheels are all returned to zero with the sensing levers 71 repositioned in their notches 73 (Figure 10). This causes the shield 54 to be retracted to the position shown, thus indicating that the results of both calculations check out. If the operator has entered one or more incorrect digits during the first or second cycle, then the memory wheel which fails to return to zero prevents the shield from being retracted (Figure 11), thus indicating that the two results fail to correspond.

According to the present disclosure, the driving system for each memory wheel 68 comprises a respective drive shaft 70 (Figures 3 and 4) rotatably journalled in bearings 75—75 mounted upon suitable brackets 76 and 77 at the forward and rearward portions of the calculating machine. The driving connection from the accumulators to the memory wheels is provided by respective gears 78 meshing with the driving gears 44 of the accumulator mechanisms. As shown in Figure 3, each gear 78 is rotatably journalled upon a cross shaft 80 having its opposite ends supported in the side plates 11. Each gear 78 includes a bevel gear 81 non-rotatably secured to its face and meshing with a similar bevel gear 82 keyed upon the forward end of drive shaft 70.

At the rearward end of the shaft 70 there is provided the shiftable reversing gear cluster 74, consisting of a pair of bevel gears 83 and 84, selectively meshing with a bevel gear 85 which is attached to the memory wheel 68. For resetting purposes as explained in detail later, the bevel gear 85 provides a friction drive to the memory wheel.

The bevel gears 83 and 84 form a part of a sleeve 86 which is slidably keyed as at 87 (Figure 14) to the rearward portion of shaft 70 which is provided with a keyway 88. The forward end of sleeve 86 includes a pair of collars 90 forming a groove 91 which is engaged by a pin 92 mounted upon the swinging end of a gear shifting arm 93. As explained later in detail, arm 93 is shifted by a cam 94 each time the cancelling lever 55 is shifted to clear the calculating machine. The arrangement is such that at the beginning of the first calculating cycle, bevel gear 84 is meshed with gear 85 (Figure 3) and during the second calculating cycle gear 83 is meshed with gear 85 (Figure 8) for reverse rotation of the memory wheel.

During the first calculating cycle, the upward motion of gear sector 35 is transmitted through the overrunning clutch 45 from idler gear 42 to the accumulator gear 46 as indicated by the arrows in Figure 7. This rotary motion rotates the numeral wheel to "5" as indicated by the arrows and also rotates drive shaft 70, causing the memory wheel to be rotated by the reversing gear 84 in the direction indicated by the arrow. It will be noted in Figure 7, that the memory wheel has rotated for one half turn, corresponding to the rotary motion imparted to the numeral wheel.

After the first calculating cycle is completed and the cancelling lever is shifted (Figure 8) to clear the machine, the accumulator gears are disengaged and the reversing gear cluster 74 is shifted, as explained above. When the cancelling lever returns back to its normal position, the accumulator gears again are engaged and the machine is conditioned for the second or proving cycle (Figure 9).

At this point the same problem is fed into the calculating machine and the gear sector 35 is again effective to rotate the accumulator gears as described previously. However, since driving connection to the memory wheels is now reversed, the memory wheels are rotated back toward their zero positions. In other words, if the numeral wheels are rotated to indicate a result corresponding to the previous cycle, then the memory wheels will also be rotated back to their zero positions. By way of example, in Figure 10, the numeral wheel of Figure 7 is shown rotated for the second time to its numeral "5," thus indicating a corresponding result. If the other numeral wheels likewise indicate a corresponding result, then the collective rollers 72 will be engaged in their notches 73 and the shield will be retracted to the position shown in Figure 10.

According to the present disclosure, the sensing levers 71 for the respective memory wheels are all keyed in common upon a rock shaft 95 journalled in the rear bearing bracket 77. Referring to Figures 4 and 9, a shield actuating lever 96 has its lower end keyed to one end of rock shaft 95 and its upper end is pivotally connected as at 97 to a shield actuating rod 98. Rod 98 has its forward end pivotally connected as at 100 to the shield 54.

The shield extends in common across all of the numeral wheels between the wheels and viewing apertures 53 and its opposite end includes end wall sectors 101—101 pivotally mounted as at 102 upon the cross shaft 52 which rotatably supports the numeral wheels (Figure 1). In cross section (Figure 10), the shield is in the form of an arcuate strip concentric to the numeral wheels and spaced outwardly for relative motion without interfering with the wheels. The arcuate portion of the shield preferably is formed of transparent material to allow the numerals to be viewed through it as shown in Figure 1, the shield having an indicating line extending across the numerals to indicate that the result has not been proven.

Since all of the sensing levers 71 are keyed upon the rock shaft 95, it will be apparent that all of the memory wheels must have returned back to the zero position in order to retract the shield. In other words if one numeral wheel, as is rotated back to "4" instead of "5," as shown in Figure 11, then the shield remains in its position overlying the numeral wheels. It will be apparent therefore, than even though the other numeral wheels of the series have checked out correctly, the error of one digit upon one of the wheels prevents the shield from being retracted.

In place of actuating the shield, the rock shaft 95 may be utilized to operate an electrical switch as indicated diagrammatically at 103 in Figure 1. The switch may be utilized to illuminate a signal light in the event the results fail to check, thus allowing the shield to be eliminated. The switch may also be used to decommission the printing mechanism of a calculating machine or to decommission a printing attachment as described later.

*Control sequence cams*

When the results of the two calculating cycles fail to correspond, it is necessary for the operator to repeat both cycles. For this purpose the cancelling lever is again actuated to clear the machine and to shift the reversible gear cluster 74 back to the starting position shown in Figure 3; this conditions the proving apparatus to repeat the two cycles. The apparatus includes a pawl and ratchet mechanism associated with the cancelling lever, which is effective, as explained below, to shift the reversible gear cluster automatically when the machine is cleared.

It will also be understood, that before the two calculating cycles can be repeated, all of the memory wheels must be reset back to their zero positions. By way of example, the memory wheel shown in Figure 11 necessarily must be rotated partially to bring the notch 73 into registry with the roller 72 of the sensing lever. The resetting or zeroing system executes its cycle upon operation of the cancelling lever at the end of the second cycle, thus restoring the proving apparatus to its initial condition. This structure is illustrated in Figures 12 to 16 and is described later.

Referring to Figures 3 and 4, the cam 94 which shifts the reversing gear cluster 74, is loosely journalled upon the shaft 58 of the cancelling lever. As shown, the cam is advanced in steps relative to its shaft by means of a ratchet 104 attached to the cam and engaged by a pawl 105 which is pivotally mounted upon the end of an arm 106. The arm is keyed to the shaft 58 and reciprocates with the shaft as the cancelling lever 55 is swung to cancelling position and returned. It will be understood that the cancelling lever is keyed directly to shaft 58.

During its forward or cancelling motion, pawl 105 engages a tooth of the ratchet and advances the cam one tooth of the ratchet. In the present disclosure, cam 94, which shifts the reversing gear cluster 74, is provided with a set of four notches 107 and the ratchet includes 8 teeth so as to advance the cam in the direction indicated by the arrow (Figure 8) one eighth turn or one half the distance between notches upon each reciprocation of the cancelling lever. The pawl 105 provides the clearance 108 between its end and the tooth which it engages (Figure 3) to allow the accumulator gear to be disengaged before the reversing gear cluster 74 is shifted as indicated in Figure 8.

The shifting motion is imparted to the reversing gear cluster 74 by the arm 93, previously noted, which includes a roller 110 tracked upon the periphery of cam 94. A spring 111 normally urges the roller toward the cam, such that the gear cluster 74 is shifted in one direction by the spring and in the opposite direction by the cam. Upon actuation of the cancelling lever at completion of the first calculating cycle, cam 94 is advanced to the position shown in Figure 8, thus causing the pin 92 to shift the reversing gears in the direction indicated by the arrow. As explained earlier, this causes the memory wheels to rotate in the opposite direction during the second calculating cycle. When the cancelling lever is actuated at completion of the second cycle, the cam is again advanced, causing roller 110 to engage the next notch so as to shift the reversing gear cluster back to its starting position. This conditions the apparatus for the next two cycles of operation.

As explained later, a second cam 112 (Figures 4 and 12) is rotatably journalled on the cancelling lever shaft and connected with cam 94 for stepwise advancement. The second cam is effective to release the single cycle clutch of the zeroing system at the end of the second cycle to reset those memory wheels which have not been returned to zero position.

*Zeroing system*

In order to repeat the two cycles of operation when the results fail to correspond, all of the memory wheels must first be returned to their zero or starting positions, with their notches 73 in registry with the rollers 72 of the sensing fingers, as noted above. The resetting mechanism, which is disclosed in Figures 12 to 16 inclusive, illustrates the movements of the parts as the cancelling lever is shifted to clear the machine at the end of the second calculating cycle.

Described in general, the zeroing system comprises a single cycle clutch indicated generally at 113, driving an idler gear 114 (Figure 14), which in turn, drives a series of reset gears 115 in mesh with the driven gear 116 of the memory wheels. Each driven gear 116 includes an interrupted portion 117 normally in registry with the teeth of reset gear 115 (Figure 13). The cyclic operation of the clutch is provided automatically upon completion of each second calculating cycle by the cam 112 which trips a clutch release lever 118. This occurs at the stroke limit of the cancelling lever as indicated in Figure 12.

Cam 112 is provided with a set of four notches 120, similar to the gear shifting cam 94, and is advanced in steps in unison with cam 94 by the pawl and ratchet mechanism as previously indicated. The notches 120 of cam 112 are so related to the notches of cam 94 that the clutch release lever 118 is tripped momentarily to release position, as shown in broken lines in Figure 12, when cam 94 shifts the gear cluster 74 back to its starting position. Release of the single cycle clutch causes rotation of the reset gear 115 of each memory wheel. If the memory wheel is in its zero position as shown in Figure 13, the interruption 117 is in registry with the reset gear 115. Thus, those memory wheels which have been returned to zero are not disturbed.

If the memory wheel is not at zero position (Figures 11 and 12), then the teeth of gears 115 and 116 are meshed. This causes rotation of the memory wheel until the interrupted section 117 is brought into registry with the reset gear so as to return the memory wheel to its zero position. In order to permit the memory wheel and its gear driven gear 116 to rotate relative to its bevel gear 85 as it is reset, a friction driving connection, indicated generally at 121 in Figure 14, is provided between the bevel gear 85 and the interrupted driven gear 116.

Described in detail with reference to Figures 14 and 15, the single cycle clutch 113 comprises a gear 122 loosely journalled upon the constantly rotating shaft 123. In the present disclosure, the shaft 123 of the ratchet wheel 23 is utilized to drive the clutch; however, it will be understood that any other constantly rotated shaft may be provided for this function, depending upon the design of the calculating machine. Gear 122 is confined on shaft 123 between a collar 124 and a rotating ratchet wheel 125 which is pinned to the shaft. A driving connection is established between the ratchet wheel 125 and gear 122 by a pawl 126 pivotally mounted as at 127 upon gear 122. The pawl includes a pin 128 upon its swinging end, which as shown in Figure 15, is normally arrested in disengaged position by the hook 130 of clutch release lever 118.

As the cancelling lever is swung toward the position shown in dotted lines in Figure 12, one of the notches 120 advances past the roller 131 journalled upon the end of the release lever 118. This allows the lever 118 to swing upwardly as shown in broken lines, under the influence of tension spring 132, which is anchored as at 133 to the lever 118. The opposite end of the spring is anchored upon a pin 134 projecting from a portion of the machine frame.

It will be noted that lever 118 is shifted momentarily to its clutch release position and immediately returns to its clutch arresting position by cam 112 to stop gear 122 upon completion of one revolution. It will also be noted that the gear shift arm 93 snaps into its notch 107 to shift the gear cluster 74 to its starting position at about the same time the clutch is released as indicated in Figure 12.

As soon as pawl 126 is released, it is snapped to clutch engaging position, as shown in broken lines in Figure 15, by a spring 135 anchored upon the gear 122 and having an end engaging the swinging end portion of the pawl. Engagement of the end of the pawl with the teeth of the rotating ratchet wheel 125 causes rotation of gear 122 and the reset gear 115 in the direction indicated by the arrows. The interrupted gears 116 and memory wheels which require resetting are thus rotated to zero as outlined above. The diameter of gear 122 is greater than the interrupted gears 116 to provide a complete revolution of the memory wheels, thus bringing the wheels to zero without respect to the position at which they may have stopped. Upon completion of one revolution, pin 128 of pawl 126 is intercepted by the hook 130 and swung to its disengaged position, bringing the gear 122 to a positive stop. A stop pin 136 projects from the gear and engages the pawl to limit its outward motion upon being arrested.

It will be noted in Figure 12 that the accumulator gear train is disengaged before the single cycle clutch is released, therefore the numeral wheels are free to return to their zero positions while the memory wheels are being reset. The speed of rotation of the single cycle clutch is sufficient to reset the memory wheels very quickly.

The design of the calculating machine may require that the drive shafts 70 be locked against rotation during the resetting operation. For this purpose, the shafts 70 may be provided with toothed locking wheels indicated diagrammatically at 137 (Figures 5, 8 and 12). These wheels are pinned to the drive shafts and lock the shafts against rotation when the cancelling lever disengages the accumulator gears. The teeth of the locking wheels are engaged by respective locking arms indicated at 138, which are attached to the cross shaft 62 of lever 61. When the cancelling lever reaches the position shown in dot and dash lines in Figure 12, cam 57 shifts the locking arms into engagement with the teeth of the wheels 137 (Figure 8). The shafts 70 are thus locked against rotation before the reversing gear cluster is shifted and before the clutch is released for the resetting operation.

As noted earlier, the bevel gears 85 are in frictional driving connection with the memory wheels to allow the memory wheels to rotate relative to their bevel gears as they are reset. This structure, as illustrated in Figure 14, consists of a friction disk 121 which is interposed between each bevel gear 85 and gear 116. Gear 116 is pinned as at 140 to the memory wheel to provide a positive drive. Each set of gears and memory wheels are rotatably journalled upon a stub shaft 141 which is pinned as at 142 to a bearing bracket 143 rising from the bracket 77 as indicated in Figure 4. A coil spring 144 is interposed in compression between bearing bracket and the memory wheel and urges gear 116 toward bevel gear 85 which is confined against the head 145 of the stub shaft. This maintains the friction disc 121 under compression to provide the friction drive from the bevel gear to the memory wheel.

In order to allow the memory wheels to rotate freely in response to the advancement of the numeral wheels during the calculating operations, the reset gears 115 are loosely journalled upon an intermediate idler shaft 146 which is carried in the side plates 11 (Figure 14). The reset gears are confined axially upon the shaft by the collars 147 which are pinned to shaft 146. During the calculating operations, the gears 115 rotate freely upon shaft 146 in response to the movements imparted to the memory wheels. During the zeroing or resetting cycle, the idler gears are coupled to the shaft 146 by respective clutches 148 as described below.

The drive from the single cycle clutch gear 122 is transmitted to reset shaft 146 by the idler gear 114 which is pinned as at 150 to the shaft. When pawl 126 is released, gear 122 rotates idler 114 and shaft 146 in the direction indicated by the arrow in Figure 12, and at the same time the clutches 148 couple the reset gears 115 to the rotating shaft 146.

Referring to Figures 15 and 16, it will be noted that gear 122 is provided with an inclined cam 151, which engages a roller 152 when the gear is in its arrested position at the end of its cycle of rotation. Roller 152 is rotatably journalled upon an arm 153 (Figures 14 and 15) projecting from a collar 154 which is pinned as at 155 to a lineally shiftable clutch control shaft 156. Pinned to shaft 156 includes a series of yoke collars 157, one for each clutch 148. Each collar includes a yoke 158 rotatably engaged in a groove 160 formed in the clutches 148. The gears 115 and companion clutches 148 are provided with mating clutch teeth indicated at 161, which are normally disengaged as shown in Figure 14. Each clutch is slidably keyed to shaft 146 as at 162 so as to drive gears 115 when engaged against them. A tension spring 163 is anchored as at 164 to shaft 156 and has its opposite end anchored as at 165 to side plate 11 so as to normally urge the shaft 156 and clutches toward the right as viewed in Figure 14.

The clutches are normally held in the position shown in Figure 14 by the engagement of the roller 152 upon cam 151 (Figure 16). As soon as clutch gear 122 is released, it begins to rotate in the direction indicated by the arrow in Figure 16, causing the cam 151 to pass from beneath the roller 152. As the roller drops from the end of the cam, spring 163 snaps the shaft 156 and clutches to the right so as to couple gears 115 to shaft 146.

If the interruption 117 of one or more of the memory wheel gears 116 is out of registry with its reset gear 115, the gear 116 will be rotated, as explained earlier, to bring the memory wheel to zero position. As indicated earlier, the friction discs 121 provide the necessary rotation of the gears 116 and memory wheels relative to their bevel gears 85. At completion of clutch rotation, the pawl 126 is intercepted and disengaged, and at the same time, cam 151 shifts roller 152 to the position shown in Figure 16 to disengage the clutches.

*Printing attachment*

The proving apparatus shown in Figures 17 to 23 follows the principles described above; however, the parts have been modified in form to adapt the apparatus to the Wittenmyer printing attachment disclosed in the patent noted previously. The modified apparatus utilizes the two calculating cycles described previously and is arranged to decommission the printing apparatus in the event the two cycles fail to correspond.

Described briefly with reference to Figures 17 and 18, the printing attachment as disclosed in the patent, is mounted at the rearward end of a standard calculating machine indicated at 166 which includes a series of visual result or numeral wheels 167. The numeral wheels are rotatably journalled on a shaft 168 and are rotated by result gears 170 to which they are attached, as best shown in Figure 19. The result gears and numeral wheels are rotated by the gears 171 which are driven by the mechanism of the calculating machine in response to the depression of the keys.

The printing attachment includes a housing 172 supporting a shaft 173 upon which is journalled a series of coupling gears 174. The coupling gears 174 are rotated by idler gears 175 (Figures 22 and 23) which mesh with gears 171 of the calculating machine. As shown in Figures 22 and 23, the idler gears 175 are in constant mesh with gears 171 and the coupling gears 174 are shifted to engaged or disengaged positions with respect to the idler gears 175. When in engaged position (Figure 23) the coupling gears establish a driving connection with a series of gear sectors 176 which are connected to the type segments (not shown) of the printing attachment. The gear sectors shift the type segments to their printing positions in response to rotation of the numeral wheels.

The printing mechanism is electrically operated in response to a control circuit which is energized to execute the printing operation when the cancelling lever 177 is actuated to clear the machine. According to the disclosure of the aforesaid Wittenmyer patent, the result normally is printed each time the cancelling lever is actuated to clear the machine. The proving apparatus is arranged to deenergize the electrical circuit so as to prevent operation of the printing mechanism after the first cycle and to maintain the circuit in deenergized condition after the second cycle if the two results fail to check.

As indicated by the broken lines in Figure 17, the gear sectors 176 are swung individually to their printing positions during rotation of the numeral wheels and gears back toward their zero position. Otherwise expressed, the coupling gears 174 are uncoupled, as shown in Figure 22, during the calculating operation, such that their companion idler gears 175 rotate freely as the numeral wheels advance to their indicating positions. Before the numeral wheels are rotated back to zero after the calculation, the coupling gears are shifted to coupling position as shown in Figure 23. Accordingly, the gear sectors are advanced to printing positions during reverse rotation of the numeral wheels toward zero. When the result wheels reach zero, the previous reading will have been transferred to the gear sectors 176 and printing sectors to be impressed upon a record sheet.

As indicated in Figures 22 and 23, the large driving gears 178 of the proving apparatus are also meshed with the coupling gear 174 for transferring the reading of the numeral wheels to the memory wheels 180 of the proving apparatus (Figures 17, 19 and 20). Each large gear 178 is rotatably journalled upon a shaft 181 extending through the housing 172. The drive from large gear 178 to the memory gear 182 is transmitted by the swinging tumbler 183 which journals forward and reverse gears 184 and 185. The tumbler 183 is shifted to two positions as indicated in Figures 19 and 20 during the first and second calculating cycles. The forward and reverse gears 184 and 185 are rotatably journalled in the tumbler which comprises a swinging frame pivotally mounted upon shaft 181. The frame resides on opposite sides of gears 178, 184 and 185, and includes stub shafts 186—186. The forward and reverse gears 184 and 185 are in constant mesh with one another and are rotatably journalled on the stub shafts.

During the first calculating cycle (Figure 19), gear 184 is meshed with large gear 178 and memory gear 182. As indicated in Figure 19, the large gear 178 drives tumbler gear 184 and memory gear 182 in the direction indicated by the arrows. This rotates the memory wheel and shifts the sensing finger 187 to the position shown in Figure 20, the notch 188 being rotated to a position corresponding to the degree of rotation of the numeral wheel 167. A shield 190 may be connected to the sensing fingers as shown, to cover the numeral wheels as described previously. In the position shown in Figure 19, the reverse tumbler gear 185 idles in the direction indicated.

After the first calculating cycle, the tumbler 183 is shifted to its second position as shown in Figure 20. This provides a reversing drive from the large gear 178 through tumbler gear 184 to the reverse tumbler gear 185, which is now meshed with the memory gear 180. As indicated by the arrows, this drives the memory wheel in the reverse direction towards its zero position during the second calculating cycle.

As indicated diagrammatically in Figures 19 and 20, an electrical control switch, comprising a swinging arm 191 pivotally mounted as at 192, is associated with the extension 193 of the sensing lever 187. If the memory wheel is returned back to zero, the contacts 194 are closed. Contacts 194, as indicated at 195, are interconnected with the control circuit of the printing mechanism. Accordingly, at completion of the first cycle, when the result is normally printed, the control circuit is deenergized (Figure 20) by the open contacts 194. If one or more of the memory wheels have failed to return to zero after the second cycle, then the contacts 194 remain open, otherwise the contacts are closed to allow the correct result to be printed.

According to the present modified arrangement, the cancelling lever 177 is utilized to shift the tumbler unit 183 and clutch release lever 196 substantially in the same manner as described earlier. For this purpose, a pinion 197 is mounted upon the cancelling lever shaft 198 and meshed with a rack bar 200 extending rearwardly to housing 172. The rearward end of the rack bar meshes with a pinion 201 which provides a pawl and ratchet connection, as described earlier, to a pair of cams indicated generally at 202. These cams, which are not shown in detail, are similar to the cams 94 and 112 for shifting the reversing gears and for releasing the single cycle clutch previously described.

As shown in Figure 17, a gear shifting arm 203 is connected by a rod 204 to the tumbler 183 to shift the tumbler gears alternately to the two positions shown in Figures 19 and 20. A second lever 205 is connected by a rod 206 to the release lever 196 which controls the single cycle clutch. The two cams 202, are advanced one step upon each reciprocation of the cancelling lever 177 by the pawl and ratchet mechanism (not shown) which is similar to the structure indicated at 104 and 105 in Figure 3. Reciprocation of the cancelling lever is thus utilized to shift the tumbler gears once upon each cancelling stroke of the lever and to release the single cycle clutch upon each second cancelling stroke, so as to reset the memory wheels as described earlier.

Since the resetting mechanism follows the structure previously described, the various details are omitted from the drawings. In general (Figure 21) it comprises a series of reset gears 207 loosely mounted upon a shaft 208 and coupled to the shaft by clutches 210. The reset gears 207 each mesh with an interrupted gear 211 journalled upon shaft 212 and pinned to the respective memory wheels. The reset gears 207 rotate the memory wheels to zero as described earlier. Shaft 208 is connected by an idler gear 213 to the gear 214 of the single cycle clutch (Figure 17). The reset gears 207 are coupled to the rotating shaft when the single cycle clutch is released as described previously. The clutches are normally disengaged as shown in Figure 21 and are engaged when the cancelling lever is shifted to clear the machine after completion of the second calculating cycle. This conditions the mechanism for the next two cycles as previously described.

*Shield control system*

Figure 24:
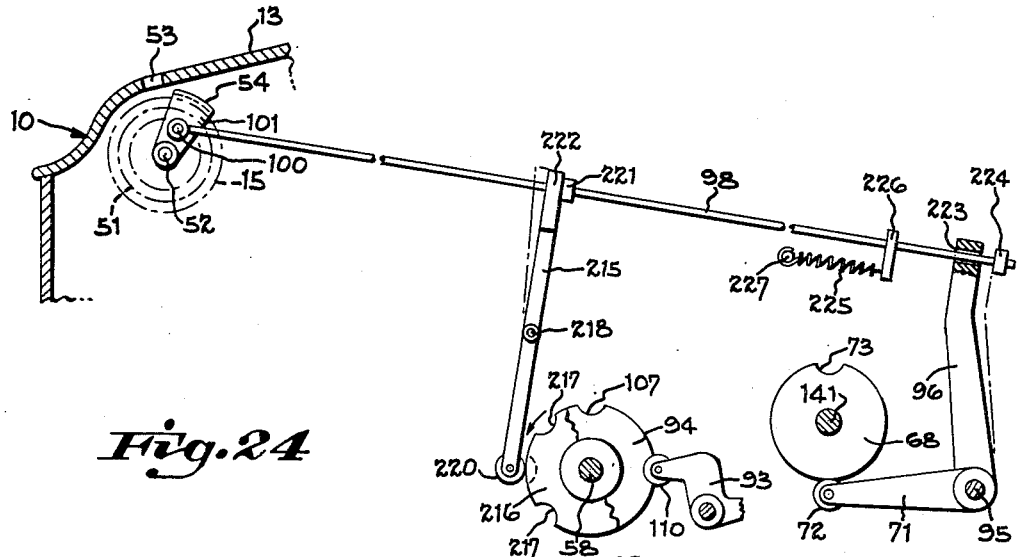
Figure 24 is a diagrammatic view of a mechanism for locking the shield in retracted position during the first calculating cycle to allow the operator to observe the first result.

The structure disclosed in Figure 24 is arranged to maintain the shield 54 in retracted position throughout the first calculating cycle and to allow it to advance toward shielding position at completion of the second cycle. In the structure described earlier, it will be noted that the shield covers the numeral wheels as soon as the first cycle is started. The purpose of the shield control system is to enable the operator to execute more complicated problems upon the machine.

By way of example, a given problem sometimes makes it necessary to multiply two sets of digits and then to multiply the result by a third set of digits. The control system allows the operator, during the first cycle, to multiply the first two sets of digits to obtain an intermediate result, and to multiply this intermediate result by a third set of digits, to obtain a final result. After the first cycle the machine is cleared and the intermediate result, which was previously copied, is entered into the machine, followed by the third set of digits. If the final result of the first and second cycles correspond, the shield will remain in retracted position at the end of the second cycle, otherwise it will cover the result wheels as described earlier.

The structure shown diagrammatically in Figure 24 is similar to the structure disclosed in Figure 7 and is shown in the corresponding position at the end of the first calculating cycle. However, it includes a shield arresting lever 215 actuated by a cam 216, which is mounted upon the shaft 58. Cam 216 is in driving connection with the clutch control and gear shifting cams previously described and is advanced in steps by the pawl and ratchet 105 and 104 with the other cams of the group.

The shield arresting cam, similar to its companion cams, is provided with four notches 217 and the arresting lever 215, which is pivotally mounted as at 218, includes a roller 220 at its lower end. Cam 216 is advanced one eighth turn upon each actuation of the cancelling lever, as previously described, and its notches 217 are so related to the roller 220 that the arresting lever is shifted to the position shown in full lines in Figure 24 during the first calculating cycle. The shield actuating rod 98 includes a stop collar 221 and the upper end of the arresting lever is forked as at 222. The forked portion straddles the rod 98 and engages the collar 221 secured to the rod to lock the shield in its retracted position although the sensing lever 96 is in shield advancing position as shown in full lines.

As indicated in cross section, the upper end of the sensing lever includes an enlarged opening 223 to loosely engage the rod 98 so as to permit the lever to move forwardly relative to a second stop collar 224 attached to the rearward end of rod 98. A tension spring 225 has one end anchored as at 226 to the rod and has its opposite end anchored as at 227 to a fixed pin to urge the rod in shield advancing direction.

It will be apparent, that at the end of the first cycle, but before the machine is cleared, the result of the first series of calculation is visible through the viewing apertures 53.

When the cancelling lever is shifted to clear the machine at the end of the first cycle as shown in Figure 8, the shield arresting cam 216 will be advanced in the direction indicated, bringing one of the notches 217 into registry with the roller 220 of the arresting lever as indicated in broken lines. At the same time, cam 94 will shift the arm 93 rearwardly to reverse the gear cluster 74. The operator now enters into the machine the intermediate result which was previously copied and the third set of digits. This causes the memory wheels to rotate back towards their zero position during the second cycle, as described earlier, so as to retract the shield if the result of the second cycle checks out.

*Modified proving apparatus*

Figure 25:
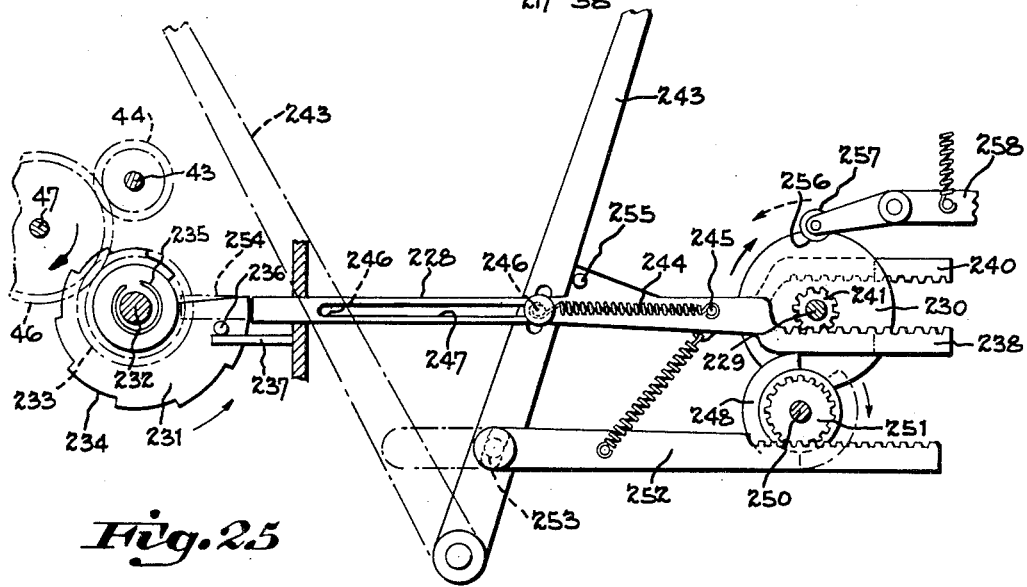
Figure 25 is a diagrammatic view showing a simplified version of the proving apparatus which is driven directly from the cancelling lever of the calculating machine.
Figure 26:
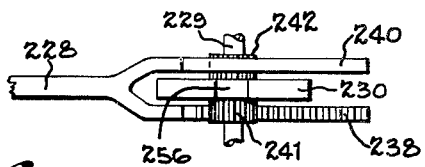
Figure 26 is a fragmentary top plan view projected from Figure 25 further illustrating the control bar and its driving connection to the memory wheel.

The modified structure shown diagrammatically in Figures 25 and 26, represents a simplified version of the proving apparatus, utilizing the same principles described above. The structure eliminates the driving system and related parts and instead is actuated directly by a hand operated feeler lever which is actuated after the first and second calculating cycles. It will be understood that the structure illustrated in the drawings is duplicated for each accumulator mechanism; however, for simplicity, the description is limited to a single unit.

The structure utilizes a lineal motion bar 228 in driving connection with a memory wheel 230 keyed on shaft 229. The motion of the bar is regulated by a stepped cam 231 which is in driving connection with the accumulator mechanism. In the form illustrated in Figure 25, cam 231 is rotatably mounted upon a shaft 232 and is rotated by a cam gear 233 which is in mesh with the accumulator gear 46. Each accumulator gear is driven by a gear 44 as previously described. The stepped cam is shown in a position corresponding to the zero position of the numeral wheel with which it is connected.

When the numeral wheel is rotated by its gear train to indicate a result, the stepped cam is rotated in the direction indicated by the arrow. The steps, indicated at 234, are ten in number, corresponding to the numerals zero to nine; thus the cam presents a step to the end of the bar 228, providing lineal motion corresponding to the digit displayed on the numeral wheel. Before the cancelling lever (not shown) is actuated to clear the machine, the hand operated feeler lever 243 is shifted to rotate the memory wheel as described later.

When the cancelling lever is shifted to clear the machine the accumulator gear is shifted out of mesh from the cam gear 233, allowing the cam to be rotated back to its zero position. For this purpose, the cam includes a motor spring 235, similar to the numeral wheels, effective to rotate it to zero. The cam may include a stop pin 236 engageable with a stationary pin 237 to arrest the cam at zero position upon being reset.

The rearward end of bar 228 includes a pair of racks 238 and 240 located on opposite sides of the memory wheel. The memory wheel has respective pinions 241 and 242 at opposite sides for two racks (Figure 26). Rack 238 meshes with pinion 241 as shown, during the first calculating cycle, to rotate the memory wheel in the direction indicated by the solid line arrow when the feeler lever 243 is actuated. The second rack 240 meshes with pinion 242 during the second calculating cycle to rotate the memory wheel in the opposite direction as indicated by the broken line arrow. Pinion 241 includes an overrunning clutch (not shown), which engages shaft 229 during the first stroke of the feeler lever to rotate the memory wheel in the direction indicated. During the return stroke, the overrunning clutch allows pinion 241 to idle upon the shaft, such that the memory wheel remains in the position to which it was rotated. Pinion 242 also includes an overrunning clutch which engages shaft 229 during the second stroke to drive the memory wheel in the direction indicated and to allow the pinion to idle upon the shaft during the return stroke.

The lineal motion bar 228 is connected to the feeler lever 243 by a tension spring 244 having its opposite ends anchored to the lever and bar as at 245 and 246. The bar includes a slot 247 which is traversed by the pin 246 anchored on the feeler lever. By operation of spring 244 and slot 247, the lever is free to be shifted for its full stroke, as indicated in broken lines, even though the steped cam may be in its zero position as indicated.

The racks 238 and 240 are shifted alternatively into mesh with their respective pinions by a single lobe cam 248 keyed on shaft 250 and rotated by a pinion 251. The lobe of the cam engages the lower surface of rack 238. Pinion 251 is connected to shaft 250 by an overrunning clutch (not shown) which rotates the shaft and cam in the direction indicated by the arrow. Pinion 251 is rotated by a rack 252 having an end pivotally connected as at 253 to the feeler lever. Upon each reciprocation of the lever, the cam is rotated a half revolution, as indicated by the broken lines. Thus, the lobe alternately raises and lowers the two racks to provide the forward and reverse rotation of the memory wheel after the two calculating cycles.

Assuming that the numeral wheel and stepped cam 231 is rotated to the "9" position during the first cycle, the bar 228 will be free to move lineally a distance indicated by the broken lines 254. Therefore, before the cancelling lever is shifted to clear the machine, the feeler lever and bar are shifted, causing the end of the bar to engage the cam. This motion is imparted to the memory wheel by rack 238 to rotate the memory wheel a corresponding distance in the direction indicated by the solid line arrow. Upon return of the feeler lever, the bar is shifted back to starting position by engagement of pin 255 by the lever. However, the memory wheel will remain stationary by operation of the overrunning clutch as explained earlier. It will be noted, that upon operation of the feeler lever after the first cycle, the single lobe cam 248 will be rotated to its second position to mesh rack 240 with pinion 242.

During the second calculating cycle, the stepped cam 231 is again rotated from its zero position in the direction indicated by the arrow. Before the second cancelling stroke, the feeler lever is again shifted, causing the lineal motion bar 228 to rotate the memory wheel in the opposite direction, since the reverse rack 240 is in mesh with pinion 242. If the results correspond, then the notch 256 of the memory wheel will move back into registry with the roller 257 of the sensing lever 258 to indicate a corresponding result. The sensing lever is connected to the shield or electrical switch as described earlier to indicate whether or not the results check out.

Having described my invention I claim:

1. A proving apparatus for a calculating machine, the calculating machine having a series of rotatable numeral wheels rotated by the machine to indicate the result of a calculation, said proving apparatus comprising; a respective memory wheel for each numeral wheel, a shaft rotatably journalling the memory wheels, each memory wheel having an indicating area on the periphery thereof which resides at a zero position before a first calculating cycle, a sensing element mounted adjacent the memory wheel, the sensing element contacting said indicating area when the memory wheel is in zero position and providing an indication thereof, respective two-position reversible driving systems connected to the memory wheels, correlating means interconnecting the driving systems with the numeral wheels to correlate the rotation of the memory wheel to the rotation of the numeral gear upon a first calculating cycle, manually controlled means connected to the two-position driving systems for shifting the same to a second position after a first calculating cycle to reverse the driving systems, said correlating means correlating the reverse rotation of the memory wheels to the rotation of the numeral wheels and gear during a second calculating cycle to advance the indicating areas of the memory wheels toward said zero position and thereby to contact sensing elements collectively to indicate that the memory wheels are rotated to zero and that the two calculating cycles correspond.

2. A proving apparatus for a calculating machine, the calculating machine having a series of rotatable numeral wheels rotated by the machine to indicate the result of a calculation, said proving apparatus comprising; a respective memory wheel for each numeral wheel, a shaft journalling the memory wheels, each memory wheel having a depression in the periphery thereof which resides at a zero position before a first calculating cycle, a sensing lever pivotally mounted adjacent each memory wheel, the sensing lever having a portion residing in said depression in indicating position when the memory wheel is in zero position and being shifted to a second position upon rotation of the memory wheel from said zero position, respective two-position reversible driving systems connected to the memory wheels, correlating means interconnecting the driving systems with the numeral wheels to correlate the rotation of the memory wheels to the rotation of the numeral gears upon a first calculating cycle, manually controlled means connected to the two-position driving systems for shifting the same to a second position after a first calculating cycle to reverse the driving systems, said interconnecting means correlating the reverse rotation of the memory wheels to the rotation of the numeral wheels during a second calculating cycle to advance the depressions of the memory wheel toward said zero position and thereby shift the sensing levers collectively to said indicating position if the two calculating cycles correspond.

3. A proving apparatus for a calculating machine, the calculating machine having rotatable numeral wheels and related numeral gears actuated by the machine to indicate the result of a calculation, said proving apparatus comprising; a series of memory wheels, means rotatably journalling the memory wheels in spaced relation to the respective numeral wheels, the memory wheels normally residing in a zero position, a respective two-position reversible driving system connecting each memory wheel to a respective numeral wheel gear, each driving system in one position rotating the memory wheel from said zero position upon rotation of the numeral wheel from a zero position, a manually operated shifting device connected to the respective driving systems for shifting the same to the second position after a first calculating cycle, thereby to rotate the memory wheels in the reverse direction toward said zero position upon rotation of the numeral wheels from a zero position during a second calculating cycle, a rock shaft journalled adjacent the memory wheels, a respective sensing lever secured upon the rock shaft and having a portion contacting the periphery of the respective memory wheels, each memory wheel having an indicating surface displaced from the periphery thereof, said surface residing in registry with the contacting portion of the sensing lever to shift the levers and rock shaft to an indicating position when the memory wheels collectively are returned to zero position, a shield pivotally mounted adjacent the numeral wheels and shiftable to an advanced or retracted position, a lever connected to the rock shaft for rocking movement therewith, connecting means extending from said lever to the shield, the sensing levers shifting the shield to a retracted position for indicating that the result of the first and second calculating cycles correspond when said indicating surfaces collectively are moved into registry with the sensing levers during the second calculating cycle.

4. A proving apparatus for a calculating machine, the calculating machine having rotatable numeral wheels and related numeral gears actuated by the machine to indicate the result of a calculation, said proving apparatus comprising; a series of memory wheels, means rotatably journalling the memory wheels in spaced relation to the respective numeral wheels, the memory wheels normally residing in a zero position, a respective two-position reversible driving system connecting each memory wheel to a respective numeral wheel gear, each driving system in one position rotating the memory wheel from said zero position upon rotation of the numeral wheel from a zero position, a manually operated shifting device connected to the respective driving systems for shifting the same to the second position after a first calculating cycle, thereby to rotate the memory wheels in the reverse direction toward said zero position upon rotation of the numeral wheels from a zero position during a second calculating cycle, a rock shaft journalled adjacent the memory wheels, a respective sensing lever secured upon the rock shaft and having a portion contacting the periphery of the respective memory wheels, each memory wheel having an indicating surface displaced from the periphery thereof, said surface residing in registry with the contacting portion of the sensing lever to shift the levers and rock shaft to an indicating position when the memory wheels collectively are returned to zero position, a lever connected to the rock shaft for rocking movement therewith, an electrical control switch mounted adjacent said lever having contact elements engaged by said lever when the sensing levers are shifted collectively to indicating position, said switch energizing a circuit which indicates that the result of the first and second calculating cycles correspond.

5. A proving apparatus for a calculating machine, the calculating machine having rotatable numeral wheels and related gears actuated by the machine to indicate the result of a calculation, said proving apparatus comprising; a series of memory wheels, means rotatably journalling the memory wheels in spaced relation to the respective numeral wheels, the memory wheels normally residing in a zero position, a respective two-position reversible driving system connecting each memory wheel to a numeral wheel gear, each driving system in one position rotating the memory wheel from said zero position upon rotation of the numeral wheel from a zero position, a manually operated shifting device connected to the respective driving systems for shifting the same to the second position after a first calculating cycle, thereby to rotate the memory wheels in the reverse direction toward said zero position upon rotation of the numeral wheels from a zero position during a second calculating cycle, a respective sensing lever pivotally mounted adjacent each memory wheel and having a portion contacting the periphery of the memory wheel, each memory wheel having an indicating surface displaced from the periphery thereof which registers with the contacting portion of the sensing lever to shift the lever to an indicating position when the memory wheel is in zero position, the sensing levers indicating that the result of the first and second calculating cycles correspond when said indicating surfaces collectively are moved into registry with the sensing levers after the second calculating cycle.

6. A proving apparatus for a calculating machine, the calculating machine having rotatable numeral wheels and related numeral gears actuated by the machine to indicate the result of a calculation, said proving apparatus comprising; a series of memory wheels, shafts rotatably journalling the memory wheels in spaced relation to the respective numeral wheels, the memory wheels normally residing in a zero position, a respective two-position reversible driving system connecting each memory wheel to a numeral wheel gear, each driving system in one position rotating the memory wheel from said zero position upon rotation of the numeral wheel from a zero position, a manually operated shifting device connected to the respective driving systems for shifting the same to the second position after a first calculating cycle, thereby to rotate the memory elements in the reverse direction toward said zero position upon rotation of the numeral wheels from a zero position during a second calculating cycle, a respective sensing lever pivotally mounted adjacent each memory wheel and having an end contacting the periphery of the memory wheel, each memory wheel having an indicating area on the periphery thereof, the indicating areas of the series of memory elements residing in registry with one another when the memory wheels collectively are returned to zero position during the second calculating cycle to indicate that the results of the first and second cycles correspond, a reset shaft adjacent the memory wheels, a memory gear attached to each memory wheel, a series of reset gears mounted upon the reset shaft, the teeth of the memory gears having an interrupted portion residing in registry with the reset gears when the memory wheels and gears reside at zero position, whereby the reset gears mesh only with those memory gears which are not returned to zero position, and shiftable rotating clutch elements engageable with the reset gears for rotating the same after a second calculating cycle.

7. A proving apparatus for a calculating machine, the calculating machine having rotatable numeral wheels and related numeral gears actuated by the machine to indicate the result of a calculation and having a shiftable cancelling lever to reset the numeral wheels to a zero position after each calculation, said proving apparatus comprising; a series of movable memory elements mounted in spaced relation to the respective numeral wheels, the memory elements normally residing in a zero position, respective two-position reversible driving systems connecting each memory element to a numeral wheel gear, each driving system in one position moving the memory element from said zero position upon rotation of the numeral wheel from a zero position, a shifting device connected to the cancelling lever and to the respective two position reversible driving systems for shifting said driving systems to the said second position when the cancelling lever is shifted after a first cancelling cycle, whereby the memory elements are moved in the reverse direction toward said zero position upon rotation of the numeral wheels from zero position during a second calculating cycle, a shiftable sensing element mounted adjacent each memory element, the sensing element having a portion in contact with the memory element, the memory element having an indicating area which registers with the contacting portion of the sensing element when the memory element is in zero position, the sensing elements indicating that the result of the first and second calculating cycles correspond when said indicating areas collectively are moved into registry with the sensing elements after the second calculating cycle.

8. A proving apparatus for a calculating machine, the calculating machine having rotatable numeral wheels and related numeral gears actuated by the machine to indicate the result of a calculation; said proving apparatus comprising a series of movable memory elements mounted in spaced relation to the respective numeral wheels, the memory elements normally residing in a zero position, respective two-position reversible driving systems connecting each memory element to a numeral wheel gear, each driving system in one position moving the memory element from said zero position upon rotation of the numeral wheel from a zero position, manually operated shifting means connected to the respective two-position reversible driving systems for shifting said driving systems to the said second position after a first cancelling cycle, whereby the memory elements are moved in the reverse direction toward said zero position upon rotation of the numeral wheels from zero position during a second calculating cycle, each memory element having an indicating area, the indicating areas of the series of memory elements residing in registry with one another when the memory elements collectively are returned to zero position during the second calculating cycle to indicate that the results of the first and second calculating cycles correspond.

9. In a proving apparatus for a calculating machine having rotatable numeral gears, the proving apparatus having memory wheels which are rotated in forward and reverse directions to indicate whether or not two calculating cycles correspond with one another; driving means connecting the individual memory wheels to the numeral gears comprising, an idler shaft mounted adjacent the numeral gears, respective driving gears journalled on said shaft and meshing with the memory gears, respective drive shafts extending at right angles from the idler shaft to the memory wheels and in driving connection with a driving gear, a bevel gear connected to the memory wheel for rotating the same, a shiftable cluster gear comprising a forward and reverse gear slidably keyed upon each drive shaft, said gears disposed on opposite sides of the bevel gear of the memory wheel, a pivotally gear shifter connected in common to the gear clusters, and manually operated means connected to the gear shifter for shifting the same alternately in forward and reverse positions to mesh the forward and reverse bevel gears with the memory wheels bevel gears, thereby to rotate the memory wheels in one direction during a first calculating cycle and to rotate the same in the reverse direction during a second calculating cycle.

10. In a proving apparatus for a calculating machine having rotatable numeral gears, the proving apparatus having memory wheels which are rotated in forward and reverse directions to indicate whether or not two calculating cycles correspond with one another; driving means connecting the individual memory wheels to the numeral gears comprising, an idler shaft mounted adjacent the numeral gears, respective driving gears journalled on said shaft and meshing with the memory gears, each driving gear having a bevel gear secured thereto, respective drive shafts extending at right angles from the idler shaft to the memory wheels, a bevel gear attached to each drive shaft and meshing with the bevel gear of a driving gear, a bevel gear connected to each memory wheel for rotating the same, a shiftable cluster gear comprising a forward and reverse bevel gear slidably keyed upon each drive shaft, said gears disposed on opposite sides of the bevel gear of the memory wheel, a pivotally mounted arm connected in common to the gear clusters, a rotatable cam in driving connection with the cancelling lever, a ratchet attached to said cam, a pawl connected to the cancelling lever and effective to advance said cam in steps upon each actuation of the cancelling lever, said cam having a camming surface engaging said arm and shifting said arm and lever alternately in forward and reverse positions to mesh the forward and reverse bevel gears with the memory wheels bevel gears, thereby to rotate the memory wheels in one direction during a first calculating cycle and to rotate the same in the reverse direction during a second calculating cycle.

11. In a proving apparatus for a calculating machine, the proving apparatus having a memory wheel rotatably mounted on a shaft, the memory wheel rotatable in forward and reverse directions relative to a zero position during a first and second calculating cycle; a reset mechanism for rotating the memory wheel to said zero position after the second calculating cycle comprising, a rotating reset shaft journalled adjacent the memory wheel, a reset gear rotatably journalled on said reset shaft, a memory gear rotatably mounted on the shaft of the memory wheel and attached to the memory wheel, said memory gear residing in position to mesh with said reset gear, the teeth of the memory gear having an interrupted area which registers with the reset gear when the memory wheel and gear reside in zero position, whereby the reset gear is free to idle relative to the memory gear and meshes therewith when the memory gear is rotated from said zero position, a clutch element slidably keyed on the reset shaft adjacent the reset gear and normally disengaged from the reset gear, the clutch element providing a driving engagement with the reset gear upon being shifted to engaged position, a yoke connected to said clutch element for shifting the same to engaged position, and manually operated control means connected to the yoke for shifting said clutch element into engagement with the reset gear to rotate the same and thereby rotate the memory wheel to said zero position.

12. In a proving apparatus for a calculating machine, the proving apparatus having a memory wheel rotatably mounted on a shaft, the memory wheel rotatable in forward and reverse directions relative to a zero position during a first and second calculating cycle; a reset mechanism for rotating the memory wheel to said zero position after the second calculating cycle comprising, a reset shaft journalled adjacent the memory wheel, a reset gear on said shaft, a memory gear rotatably mounted on the shaft of the memory wheel and connected to the memory wheel, said memory gear residing in a position to mesh with said reset gear, the teeth of the memory gear having an interrupted area which registers with the reset gear when the memory wheel and gear reside in zero position, whereby the reset gear is free to idle relative to the memory gear and meshes therewith when the memory gear is rotated from said zero position, and manually operated control means connected to the reset gear for rotating the same, thereby to rotate the memory wheel to said zero position.

13. In a proving apparatus for a calculating machine, the proving apparatus having a series of rotatable memory wheels which rotate in forward and reverse directions relative to a zero position during a first and second calculating cycle; a reset mechanism for rotating the memory wheels to said zero after a second calculating cycle comprising, a rotating power shaft, a normally arrested single cycle clutch mounted on said shaft and including a shiftable release lever, the single cycle clutch including a clutch gear which is driven by said power shaft upon shifting of the release lever, a reset shaft rotatably mounted adjacent said clutch, a gear keyed to said shaft and meshing with the clutch gear, a series of reset gears rotatably journalled on the reset shaft, a memory gear attached to each memory wheel and residing in position to mesh with the respective reset gears, the teeth of the memory gears having an interrupted portion which registers with the reset gears when the memory wheel and gear reside in zero position, whereby the reset gears are free to idle relative to the memory gear and mesh therewith when the memory gears are rotated from said zero position, respective clutch elements slidably keyed on the reset shaft adjacent the reset gears and normally disengaged from the reset gears, the clutch elements providing a driving engagement with the reset gears upon being shifted to engaged position, a respective yoke connected to each of said clutches for shifting the same, a slidable yoke actuating shaft connected to said yokes, cam means on said clutch gear connected to the clutch actuating shaft for shifting said clutch actuating shaft to disengaged position when the clutch is arrested and manually operated control means connected to the clutch release lever for releasing the clutch after a second calculating cycle, thereby to rotate the reset gears and rotate to zero those memory gears and wheels which mesh with the reset gears.

14. In a proving apparatus for a calculating machine having numeral wheels and a shiftable cancelling lever, the proving apparatus having a series of memory wheels one for each numeral wheel of the calculating machine, the memory wheels being in driving connection with the respective numeral wheels and rotated in forward and reverse directions during a first and second calculating cycle to indicate whether said cycles correspond; an indicating mechanism for said memory wheels comprising, a rock shaft journalled adjacent the memory wheels, respective sensing levers keyed upon the rock shaft and having a portion contacting the periphery of the memory wheel, each memory wheel having an indicating surface displaced from the periphery thereof, said surface residing in registry with the contacting portion of the sensing lever to shift the lever and rock shaft to an indicating position when the memory wheels collectively are returned to zero position after a second calculating cycle, an indicating shield pivotally mounted adjacent the numeral wheels and shiftable to an indicating position, a lever connected to the rock shaft, actuating means extending from the lever to the shield, a pivotally mounted arresting lever having means connected to the shield normally locking the shield in non-indicating position, a cam rotatably mounted adjacent the cancelling lever, ratchet means connecting the cancelling lever to the said cam for advancing the cam in steps upon shifting of the cancelling lever, said cam having a camming surface engaging the arresting lever, said ratchet means advancing the cam and arresting lever to indicating position upon a stroke of the cancelling lever after the first calculating cycle, the cam and arresting lever releasing the shield for advancement to indicating position during a second calculating cycle, whereby the memory wheels shift the same to indicating position if the first and second calculating cycles correspond.

15. A proving apparatus for a printing attachment, the attachment having a series of coupling gears driven by the numeral gears of a calculating machine, the printing attachment including printing elements shifted by said coupling gears and a control system for initiating a printing cycle; said proving apparatus comprising a shaft mounted adjacent the coupling gears, respective driving gears rotatably journalled on the shaft and meshing with the coupling gears, respective tumblers pivotally mounted on said shaft and having a forward and reverse tumbler gear journalled on the swinging portion thereof meshing with one another, a memory wheel shaft mounted adjacent said tumbler gears, respective memory gears rotatably journalled on said shaft in position to mesh with the tumbler gears, respective memory wheels mounted on said shaft and in driving connection with the memory gears, a shiftable sensing element mounted adjacent each memory wheel and having a portion in contact with the periphery of the memory wheel, each memory wheel having an indicating area which shifts the sensing element when the memory wheel is in a zero position, the forward tumbler gears meshing with the drive gears and memory gears during a first calculating cycle to rotate the memory wheels from said zero position, manually operated means for shifting said tumblers after a first calculating cycle, thereby to mesh the reverse tumbler gears with the memory gears to drive the memory wheels toward said zero position during a second calculating cycle, whereby the indicating areas thereof are shifted toward the sensing elements, and an electrical switch mounted adjacent one of said sensing elements and having contacts engaged thereby when the sensing elements collectively contact the indicating area, said switch energizing the circuit which initiates the printing cycle to cause the printing attachment to print the result if the first and second calculating cycles correspond.

16. In a proving apparatus for a printing attachment having a series of coupling gears driven by the numeral gears of a calculating machine, said proving apparatus having a shaft mounted adjacent the coupling gears, respective driving gears rotatably journalled on the shaft and meshing with the coupling gears, respective tumblers pivotally mounted on said shaft and having forward and reverse tumbler gears journalled on the swinging portion thereof meshing with one another, a memory wheel shaft mounted adjacent said tumbler gears, respective memory gears rotatably journalled on said shaft in position to mesh with the tumbler gears, respective memory wheels mounted on said shaft and in driving connection with the memory gears, the memory wheels each having an indicating area which collectively register with one another when the memory wheels are in a zero position, the forward tumbler gears meshing with the drive gear and memory gear during a first calculating cycle to rotate the memory wheels from said zero position, manually operated means for shifting said tumblers after a first calculating cycle, thereby to mesh the reverse tumbler gears with the memory gears to drive the memory wheels toward said zero position during a second calculating cycle, whereby the indicating areas thereof are shifted toward the zero position to indicate that the results of the first and second calculating cycles correspond.

17. A proving apparatus for a calculating machine, the calculating machine having a series of rotatable numeral gears actuated by the machine to indicate the result of a calculation and having a shiftable cancelling lever; said proving apparatus comprising, a respective memory wheel for each numeral gear, a shaft rotatably journalling said memory wheel, the memory wheels having an indicating portion thereon, said indicating portions residing collectvely in an indicating position when the memory wheels are in a zero position, a respective two-position reversible driving system for each memory wheel, each driving system comprising a slidably mounted lineal motion bar, a respective first and second rack on said bar having rack teeth facing one another, a pinion connected to each memory wheel for rotating the same, said first and second racks spaced from one another a distance greater than the diameter of said pinion and being shiftable alternately into mesh therewith, the first of said racks normally meshing with the pinion, a respective cam rotatably mounted adjacent each numeral gear and in driving connection therewith, said cam having steps providing a generally spiral periphery, the steps corresponding to the digits of the numeral wheels and being advanced from a zero position upon rotation of the numeral gear from a zero position, said cam being mounted adjacent an end of the lineal motion bar to regulate the movement thereof, thereby to correlate the rotary motion of the memory gear to the rotation of the numeral wheel, a manually operated feeler lever, spring means connecting the lineal motion bar to the feeler lever to shift the said bar toward said cam when the lever is shifted after a first calculating cycle, and means interconnecting the lineal motion bar and feeler lever to shift said second rack into mesh with said pinion to provide reverse rotation of the memory wheel upon shifting the feeler lever after a second calculating cycle to rotate the memory wheels back toward zero position when the lever is shifted after a second calculating cycle, whereby said indicating portions collectively indicate whether or not the first and second calculating cycles correspond.

18. A proving apparatus for a calculating machine, the calculating machine having a series of rotatable numeral gears actuated by the machine to indicate the result of a calculation and having a shiftable cancelling lever; said proving apparatus comprising, a respective memory wheel for each numeral gear, a shaft rotatably journalling said memory wheel, the memory wheels having an indicating portion thereon, said indicating portions residing collectively in an indicating position when the memory wheels are in a zero position, a respective two-position reversible driving system for each memory wheel, each driving system comprising a slidably mounted lineal motion bar, a respective first and second rack on said bar having rack teeth facing one another, a pinion connected to the memory wheel for rotating the same, said first and second racks spaced from one another a distance greater than the diameter of said pinion and being shiftable alternately into mesh therewith, said first rack normally meshing with the pinion, a respective cam rotatably mounted adjacent each numeral gear and in driving connection therewith, said cam having a generally spiral periphery providing steps corresponding to the digits of the numeral wheels and being advanced from a zero position upon rotation of the numeral gear from a zero position, said cam being mounted adjacent an end of the lineal motion bar to regulate the movement thereof, thereby to correlate the rotary motion of the memory wheel to the advancement of the numeral wheel, manually operated feeler means connected to the lineal motion bar for shifting the same lineally after a first calculating cycle and for shifting said second rack into mesh with said pinion thereafter, thereby to rotate the memory wheels in one direction after a first calculating cycle and the reverse direction after a second cycle, the indicating portions collectively indicating whether or not the first and second calculating cycles correspond.

19. A proving apparatus for a calculating machine having rotatable numeral wheels and related driving means normally residing in a zero position, the calculating machine having means for disengaging the driving means from the numeral wheels to return the numeral wheels to zero after a calculating cycle, said proving apparatus comprising, a plurality of shiftable memory elements, one for each numeral wheel, a plurality of two-position reversible driving systems, one for each memory element, said driving systems connecting the driving means of the numeral wheels individually to the memory elements, said driving systems normally residing in a first position to shift the memory elements in a given direction and shifting the same in the reverse direction upon being shifted to a second position, said memory elements each having indicating means thereon normally residing in positions indicating a correct result when said numeral wheels and related driving means reside in said zero position before a first calculating cycle, said driving systems shifting said memory elements during a first calculating cycle in response to the advancement of the numeral wheels, said memory elements remaining in said shifted positions when the related driving means of the calculating machine are disengaged to return the numeral wheels to zero, and means connected to the reversible driving systems for shifting the same to said second position after the first calculating cycle, thereby to shift the memory elements in reverse upon a second calculating cycle to indicate that the result of the second calculating cycle corresponds to the result of the first cycle if the memory elements are returned to said positions indicating a correct result.

References Cited in the file of this patent

UNITED STATES PATENTS

| | | |
|---|---|---|
| 1,283,293 | Poole | Oct. 29, 1918 |
| 2,087,542 | Muller | July 20, 1937 |